(12) United States Patent
Nakayama et al.

(10) Patent No.: US 12,204,804 B2
(45) Date of Patent: Jan. 21, 2025

(54) PRINTING APPARATUS, NON-TRANSITORY COMPUTER-READABLE STORAGE MEDIUM, AND METHOD FOR SELECTING WHETHER TO RETAIN OR DELETE SELECTED JOBS AFTER PRINTING BASED ON ENABLING OR NOT ENABLING A SINGLE CHECK BOX WHICH CHANGES THE WORDING OF A PRINT BUTTON

(71) Applicant: BROTHER KOGYO KABUSHIKI KAISHA, Nagoya (JP)

(72) Inventors: Rui Nakayama, Gifu (JP); Shuya Ichikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/345,121

(22) Filed: Jun. 30, 2023

(65) Prior Publication Data
US 2024/0004597 A1     Jan. 4, 2024

(30) Foreign Application Priority Data

Jun. 30, 2022   (JP) ................................ 2022-106428
Jun. 30, 2022   (JP) ................................ 2022-106452

(51) Int. Cl.
*G06F 3/12*     (2006.01)
*G06F 3/041*    (2006.01)
(Continued)

(52) U.S. Cl.
CPC .......... *G06F 3/1237* (2013.01); *G06F 3/0412* (2013.01); *G06F 3/04817* (2013.01);
(Continued)

(58) Field of Classification Search
CPC .. G06F 3/1237; G06F 3/0412; G06F 3/04817; G06F 3/1204; G06F 3/1284; G06F 21/31
(Continued)

(56) References Cited

U.S. PATENT DOCUMENTS

2006/0256364 A1*  11/2006  Yamamoto ......... G06K 15/1817
                                                                 358/1.14
2009/0303530 A1*  12/2009  Honma ................. H04N 1/444
                                                                 358/1.15
(Continued)

FOREIGN PATENT DOCUMENTS

JP        2006341591 A      12/2006
JP        2010118762 A      5/2010
(Continued)

*Primary Examiner* — Chad Dickerson
(74) *Attorney, Agent, or Firm* — Scully, Scott, Murphy & Presser, PC

(57) ABSTRACT

A printing apparatus includes a reception interface, a display, a print engine, a storage, and a controller. The controller displays, on the display, print jobs stored in the storage, and an operable selection object. In response to input operations received via the reception interface, the controller selects one or more print jobs from among the print jobs displayed on the display and sets the operable selection object to select one of job retention printing and job deletion printing. The controller determines whether to retain or delete the selected one or more print jobs after printing by the print engine, based on which of the job retention printing and the job deletion printing is selected by the operable selection object.

20 Claims, 27 Drawing Sheets

(51) Int. Cl.
   *G06F 3/04817*   (2022.01)
   *G06F 21/31*   (2013.01)
   *H04N 1/00*   (2006.01)

(52) U.S. Cl.
   CPC .......... *G06F 3/1204* (2013.01); *G06F 3/1284* (2013.01); *G06F 21/31* (2013.01)

(58) Field of Classification Search
   USPC ............................... 358/1.11–1.18, 400–404
   See application file for complete search history.

(56) References Cited

U.S. PATENT DOCUMENTS

| | | | |
|---|---|---|---|
| 2010/0118338 A1 | 5/2010 | Sakiyama et al. | |
| 2013/0050759 A1* | 2/2013 | Tsuchiya | G06K 15/4055 |
| | | | 358/1.15 |
| 2016/0085493 A1* | 3/2016 | Kaneko | G06F 3/1222 |
| | | | 358/1.15 |
| 2019/0107983 A1* | 4/2019 | Ito | G06F 3/1267 |

FOREIGN PATENT DOCUMENTS

| | | |
|---|---|---|
| JP | 2017040681 A | 2/2017 |
| WO | WO-2018047555 A1 * | 3/2018 |

\* cited by examiner

| JOB NAME | USER IDENTIFICATION INFORMATION | FLAG FOR PREVIOUS JOB RETENTION PRINTING |
|---|---|---|
| PRINT JOB 1 | User A | OFF |
| PRINT JOB 2 | User A | OFF |
| PRINT JOB 3 | User A | OFF |
| PRINT JOB 4 | User A | OFF |
| PRINT JOB 5 | User A | OFF |
| PRINT JOB 6 | User B | OFF |

FIG. 14A

| JOB NAME | USER IDENTIFICATION INFORMATION | FLAG FOR PREVIOUS JOB RETENTION PRINTING |
|---|---|---|
| PRINT JOB 1 | User A | ON |
| PRINT JOB 2 | User A | OFF |
| PRINT JOB 3 | User A | ON |
| PRINT JOB 4 | User A | OFF |
| PRINT JOB 5 | User A | OFF |
| PRINT JOB 6 | User B | OFF |

FIG. 14B

PRINTING APPARATUS, NON-TRANSITORY COMPUTER-READABLE STORAGE MEDIUM, AND METHOD FOR SELECTING WHETHER TO RETAIN OR DELETE SELECTED JOBS AFTER PRINTING BASED ON ENABLING OR NOT ENABLING A SINGLE CHECK BOX WHICH CHANGES THE WORDING OF A PRINT BUTTON

REFERENCE TO RELATED APPLICATIONS

This application claims priority from Japanese Patent Applications No. 2022-106452 and No. 2022-106428, each filed on Jun. 30, 2022. The entire contents of the priority applications are incorporated herein by reference.

BACKGROUND ART

A printing apparatus has been known that is configured to store print data to which authentication information is assigned in a print data storage, accept a password input by a user, and if there is, in the print data storage, specific print data having a password matching the input password, perform printing based on the specific print data. The printing apparatus is further configured to, after accepting the input password and before printing, display a selection screen for selecting whether to retain the specific print data in the print data storage after printing or delete all the specific print data from the print data storage after printing. Thus, the user is allowed to select whether to retain the specific print data having the password matching the input password, in the print data storage even after printing.

DESCRIPTION

However, the known printing apparatus is unable to, prior to printing based on print data selected from among the stored print data, select for each print data whether to retain the selected print data in the print data storage after printing.

Aspects of the present disclosure are advantageous for providing one or more improved techniques for a printing apparatus that make it possible to, prior to printing based on one or more print jobs selected, select whether to retain the selected one or more print jobs after printing.

According to aspects of the present disclosure, a printing apparatus is provided, which includes a reception interface, a display, a print engine, a storage, and a controller. The controller is configured to cause the display to display thereon print jobs stored in the storage, and an operable selection object configured to select any one of job retention printing and job deletion printing. The controller is further configured to, in response to input operations received via the reception interface, select one or more print jobs from among the print jobs displayed on the display, and set the operable selection object to select one of the job retention printing and the job deletion printing. The controller is further configured to cause the print engine to perform a printing process to print images based on the selected one or more print jobs on sheets. The controller is configured to determine whether to retain or delete the selected one or more print jobs after the printing process, based on which of the job retention printing and the job deletion printing is selected by the operable selection object. The one or more print jobs for which the printing process has been completed are retained in the storage after the printing process, when the job retention printing is selected. The one or more print jobs for which the printing process has been completed are deleted from the storage after the printing process, when the job deletion printing is selected.

According to aspects of the present disclosure, further provided is a non-transitory computer-readable storage medium storing computer-readable instructions executable by a processor of a printing apparatus including a reception interface, a display, a print engine, and a storage. The instructions are configured to, when executed by the processor, cause the printing apparatus to cause the display to display thereon print jobs stored in the storage, and an operable selection object configured to select any one of job retention printing and job deletion printing. The instructions are further configured to, when executed by the processor, cause the printing apparatus to, in response to input operations received via the reception interface, select one or more print jobs from among the print jobs displayed on the display, and set the operable selection object to select one of the job retention printing and the job deletion printing. The instructions are further configured to, when executed by the processor, cause the printing apparatus to cause the print engine to perform a printing process to print images based on the selected one or more print jobs on sheets. The instructions are further configured to, when executed by the processor, cause the printing apparatus to determine whether to retain or delete the selected one or more print jobs after the printing process, based on which of the job retention printing and the job deletion printing is selected by the operable selection object. The one or more print jobs for which the printing process has been completed are retained in the storage after the printing process, when the job retention printing is selected. The one or more print jobs for which the printing process has been completed are deleted from the storage after the printing process, when the job deletion printing is selected.

According to aspects of the present disclosure, further provided is a method implementable on a controller of a printing apparatus including a reception interface, a display, a print engine, and a storage. The method includes causing the display to display thereon print jobs stored in the storage, and an operable selection object configured to select any one of job retention printing and job deletion printing. The method further includes selecting, in response to input operations received via the reception interface, one or more print jobs from among the print jobs displayed on the display, and setting the operable selection object to select one of the job retention printing and the job deletion printing. The method further includes causing the print engine to perform a printing process to print images based on the selected one or more print jobs on sheets. The method further includes determining whether to retain or delete the selected one or more print jobs after the printing process, based on which of the job retention printing and the job deletion printing is selected by the operable selection object. The one or more print jobs for which the printing process has been completed are retained in the storage after the printing process, when the job retention printing is selected. The one or more print jobs for which the printing process has been completed are deleted from the storage after the printing process, when the job deletion printing is selected.

FIG. 14A shows an example of job management information.

FIG. 14B shows another example of the job management information.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

Figure 1:
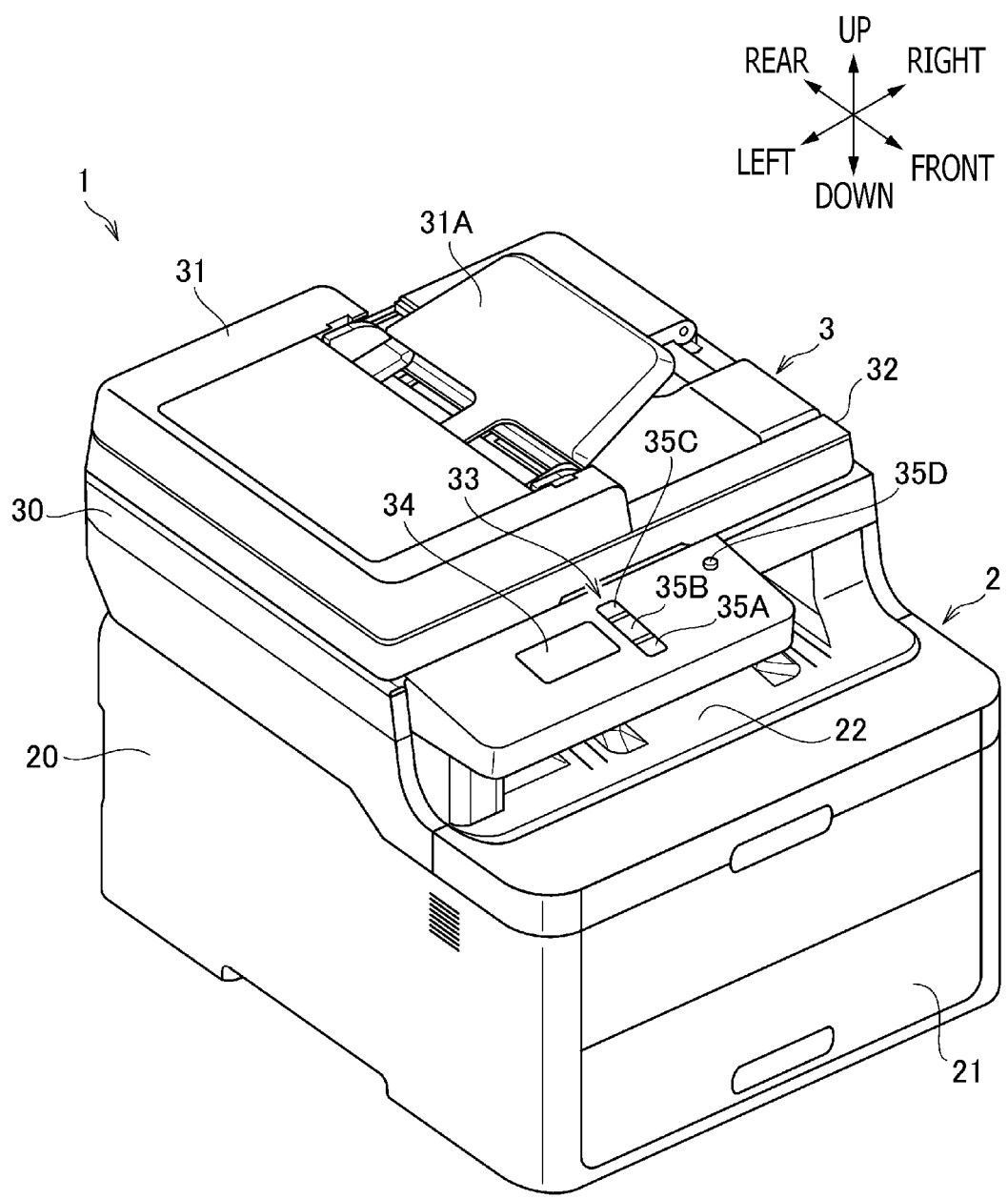
FIG. 1 is a perspective view showing an external appearance of a multi-function peripheral (hereinafter referred to as an "MFP").

FIG. 1 is a perspective view showing an external appearance of a multi-function peripheral (hereinafter referred to as an "MFP") 1 in a first illustrative embodiment according to aspects of the present disclosure. The MFP 1 may be an example of a "printing apparatus" according to aspects of the present disclosure. The MFP 1 has a printing function, a copy function, a scanning function, and a facsimile function. Examples of the MFP 1 are not limited to an MFP having all of the above functions, but may include an MFP without the facsimile function. In the following description, an upward direction and a downward direction along a vertical direction, a frontward direction and a rearward direction along a front-to-rear direction, and a leftward direction and a rightward direction along a left-to-right direction may be defined as indicated by arrows in FIG. 1.

The MFP 1 includes a print engine 2, an image scanner 3, an operation panel 33, and a touch panel 34. The print engine 2 has an electrophotographic printing function. Printing methods applicable for the print engine 2 are not limited to the electrophotographic method, but may include an inkjet method. A housing 20 of the print engine 2 has a feed tray 21 and a discharge tray 22. The feed tray 21 is configured to accommodate a plurality of sheets such as plain paper. The print engine 2 is configured to print an image on a sheet fed from the feed tray 21 and discharge the sheet with the image printed thereon onto the discharge tray 22. Types of sheets storable in the feed tray 21 are not limited to plain paper, but may include thick paper.

The image scanner 3 has a scanning function. The image scanner 3 includes a housing 30, a document conveyor 31, and a document cover 32. The document conveyor 31 has a document tray 31A configured to support a plurality of document sheets set thereon. The document cover 32 is provided to be rotatable with respect to a placing table of the housing 30.

The operation panel 33 and the touch panel 34 are disposed on a front face of the MFP 1. The operation panel 33 has the touch panel 34, and physical keys 35 such as a cancel key 35A, a home key 35B, a return key 35C, and a power key 35D.

Figure 2:
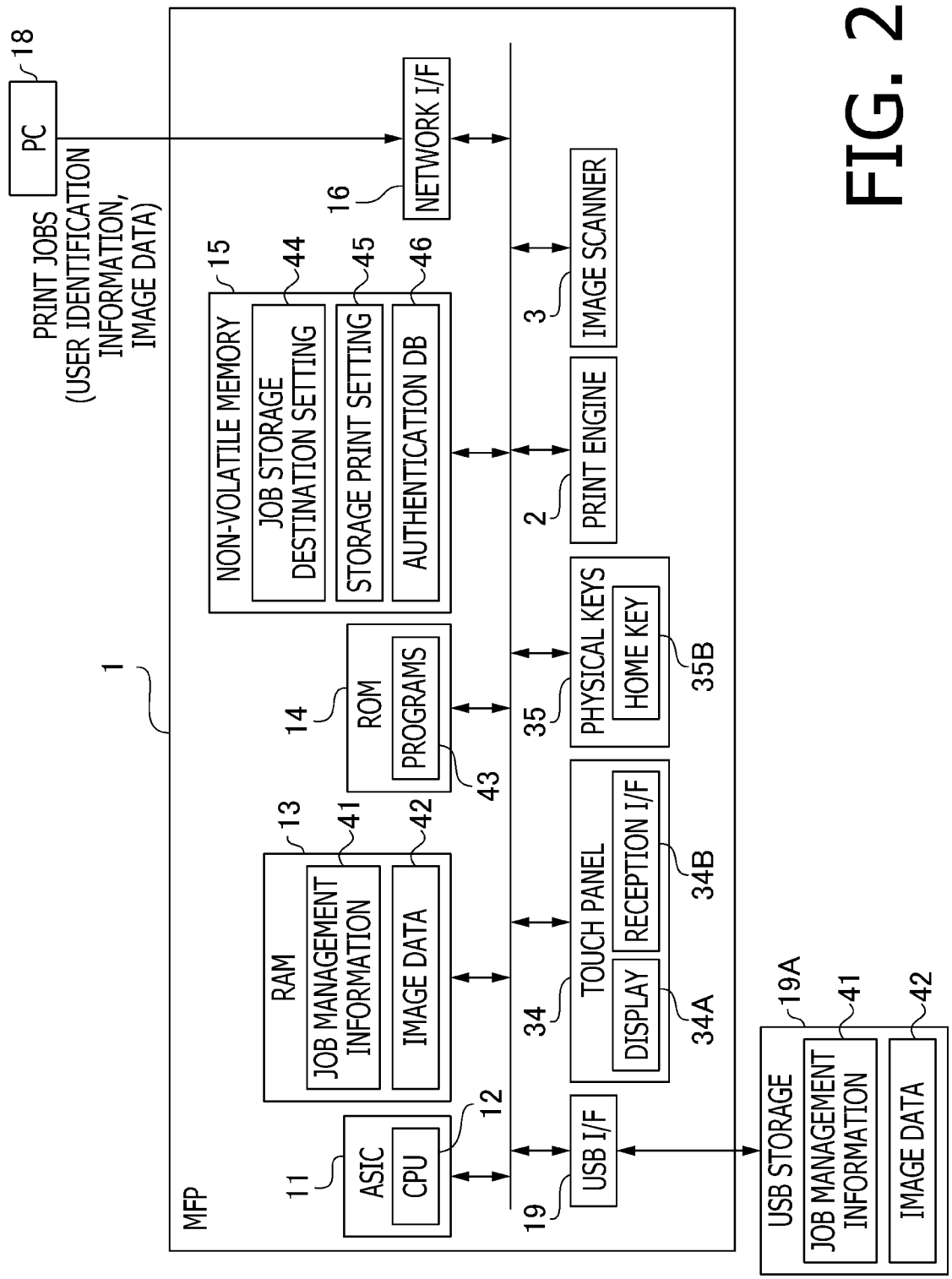
FIG. 2 is a block diagram showing an electrical configuration of the MFP.

FIG. 2 is a block diagram showing an electrical configuration of the MFP 1. The MFP 1 includes the print engine 2, the image scanner 3, an ASIC 11, a RAM 13, a ROM 14, a non-volatile memory 15, a network I/F 16, and a USB I/F 19.

The ASIC 11 has a CPU 12 mounted thereon. The CPU 12 may be an example of a "controller" according to aspects of the present disclosure. The CPU 12 is configured to take overall control of individual elements included in the MFP 1. The ASIC 11 may be used as (i.e., may be included in examples of) the "controller" according to aspects of the present disclosure. The ROM 14 stores programs 43 for controlling the MFP 1. The CPU 12 executes the programs 43 using the RAM 13 as a work area. Thus, the CPU 12 is configured to control the MFP 1 by executing the programs 43 stored in the ROM 14. The CPU 12 and the ROM 14 storing the programs 43 may be included in the "controller" according to aspects of the present disclosure. The non-volatile memory 15 includes an NVRAM. The non-volatile memory 15 is configured to store settings for various processes by the MFP 1 and data used for the various processes.

The network I/F 16 may be an example of a "communication interface" according to aspects of the present disclosure. The MFP 1 is connected with a LAN via the network I/F 16. Thereby, the MFP 1 is enabled to communicate with a PC 18. The PC 18 is an information terminal operable by a user (including an administrator) of the MFP 1. The PC 18 is an example of an "external terminal" according to aspects of the present disclosure. The network I/F 16 may be connected with a network other than the LAN. Examples of the "external terminal" are not limited to the PC 18, but may include information terminals (e.g., smartphones and tablet terminals) other than PCs. The MFP 1 is connected, via the USB I/F 19, with a USB storage 19A from the outside of the MFP 1.

The touch panel 34 has a display 34A and a reception I/F 34B. The display 34A of the touch panel 34 may be an example of a "display" according to aspects of the present disclosure. The display 34A includes a liquid crystal display. The display 34A is configured to display an operation screen of the MFP 1. The reception I/F 34B is configured to receive a user's touch operation and detect a position pressed by the user. A liquid crystal display without the reception I/F 34B may be used as the "display" according to aspects of the present disclosure. The physical keys 35 are configured to receive user input operations. The reception I/F 34B and the physical keys 35 may be included in examples of a "reception interface" according to aspects of the present disclosure.

The USB storage 19A may be an example of a "storage" according to aspects of the present disclosure. The USB storage 19A is configured to store print jobs. Each print job includes at least image data 42. Each print job may have user identification information and a job name added thereto. The USB storage 19A stores job management information 41. For a print job to which user identification information and a job name are added, the user identification information and the job name are stored as the job management information 41 in the USB storage 19A. The RAM 13 may be used as (i.e., may be included in examples of) the "storage" according to aspects of the present disclosure. In this case, the image data 42 of the print job, and the job management information 41 may be stored in the RAM 13.

Figure 3:
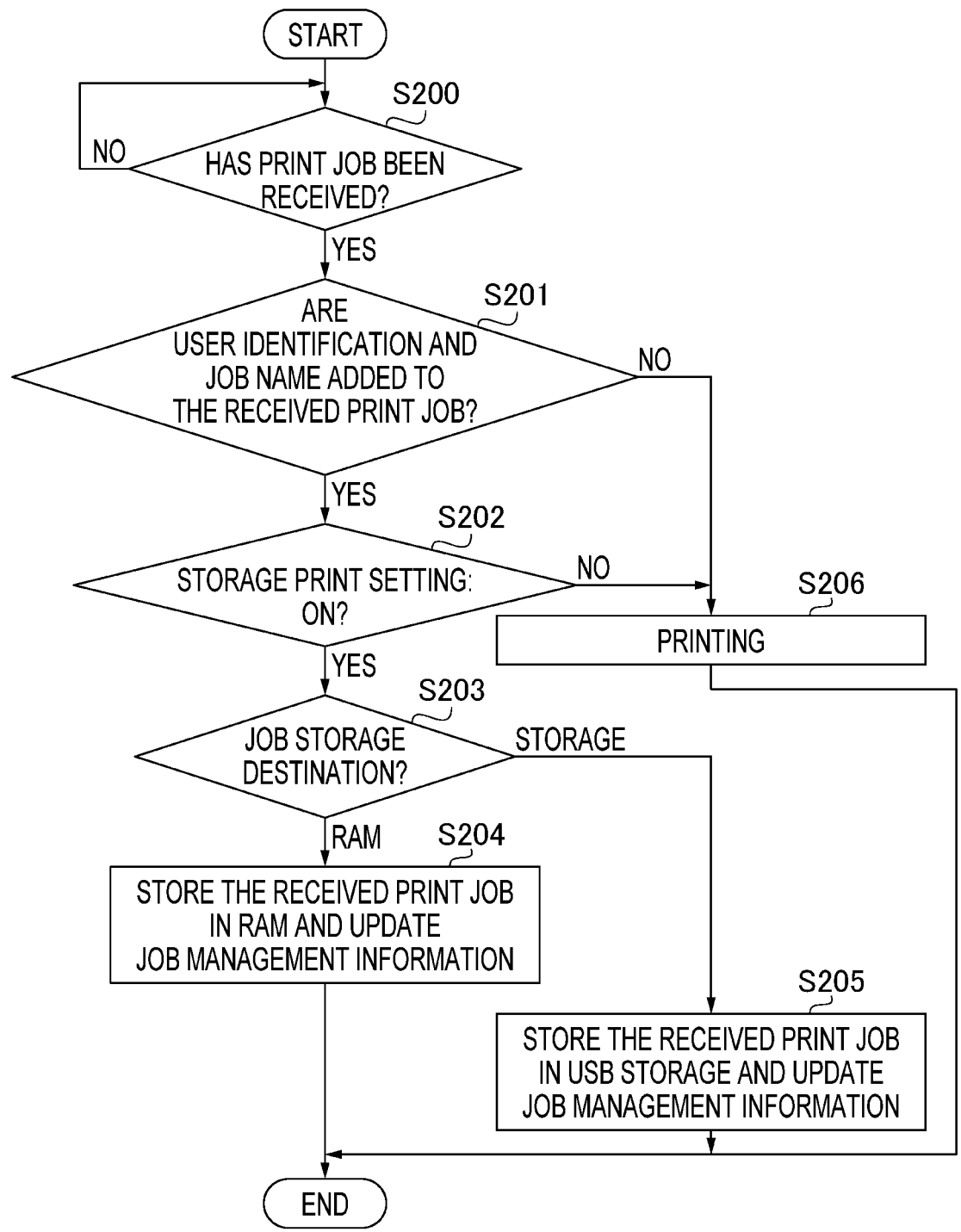
FIG. 3 is a flowchart showing a procedure of a process to store print jobs in a storage.

FIG. 3 is a flowchart showing a procedure of a job storing process to store a print job in the storage including the USB storage 19A and the RAM 13. In the following description, each of the steps in each process will be represented with "S" added in front of a corresponding reference numeral.

In response to receiving a print job from the PC 18 via the network I/F 16 (S200: Yes), the CPU 12 determines whether the user identification information and the job name are added to the received print job (S201). In response to determining in S201 that the user identification information and the job name are added to the received print job (S201: Yes), the CPU 12 proceeds to S202. Meanwhile, in response to determining in S201 that the user identification information and the job name are not added to the received print job (S201: No), the CPU 12 proceeds to S206.

In S202, the CPU 12 determines whether a storage print setting 45 stored in the non-volatile memory 15 is ON. The storage print setting 45 is a setting as to whether an after-mentioned storage printing process is executable. Namely, when the storage print setting 45 is ON, the storage printing process is executable. In response to determining in S202 that the storage print setting 45 is ON (S202: Yes), the CPU 12 proceeds to S203. Meanwhile, in response to determining in S202 that the storage print setting is OFF (S202: No), the CPU 12 proceeds to S206.

In S203, the CPU 12 determines which storage destination is indicated by a job storage destination setting 44 stored in the non-volatile memory 15. The job storage destination setting 44 is for setting whether the received print job is to be stored in RAM or STORAGE. In response to determining in S203 that RAM is indicated by the job storage destination setting 44 (S203: RAM), the CPU 12 stores the print job received from the PC 18 in the RAM 13 (S204). Specifically, the CPU 12 stores the image data 42 of the print job in the RAM 13. Further, the CPU 12 adds the job name and the user identification information added to the print job to the job management information 41, and stores in the RAM 13 the job management information 41 to which the job name and the user identification information have been added. Thereafter, the CPU 12 terminates the process shown in FIG. 3.

On the other hand, in response to determining in S203 that STORAGE is indicated by the job storage destination setting 44 (S203: STORAGE), the CPU 12 stores the print job received from the PC 18 in the USB storage 19A (S205). Specifically, the CPU 12 stores the image data 42 of the print job in the USB storage 19A. Further, the CPU 12 adds the job name and the user identification information added to the print job to the job management information 41, and stores the job management information 41 after the addition in the USB storage 19A. Thereafter, the CPU 12 terminates the process shown in FIG. 3.

In response to determining in S201 that the user identification information and the job name are not added to the received print job (S201: No) or determining in S202 that the storage print setting 45 is OFF (S202: No), the CPU 12 proceeds to S206. In S206, the CPU 12 controls the print engine 2 to print on a sheet an image based on the image data of the print job received from the PC 18. Thereafter, the CPU 12 terminates the process shown in FIG. 3.

Figure 5:
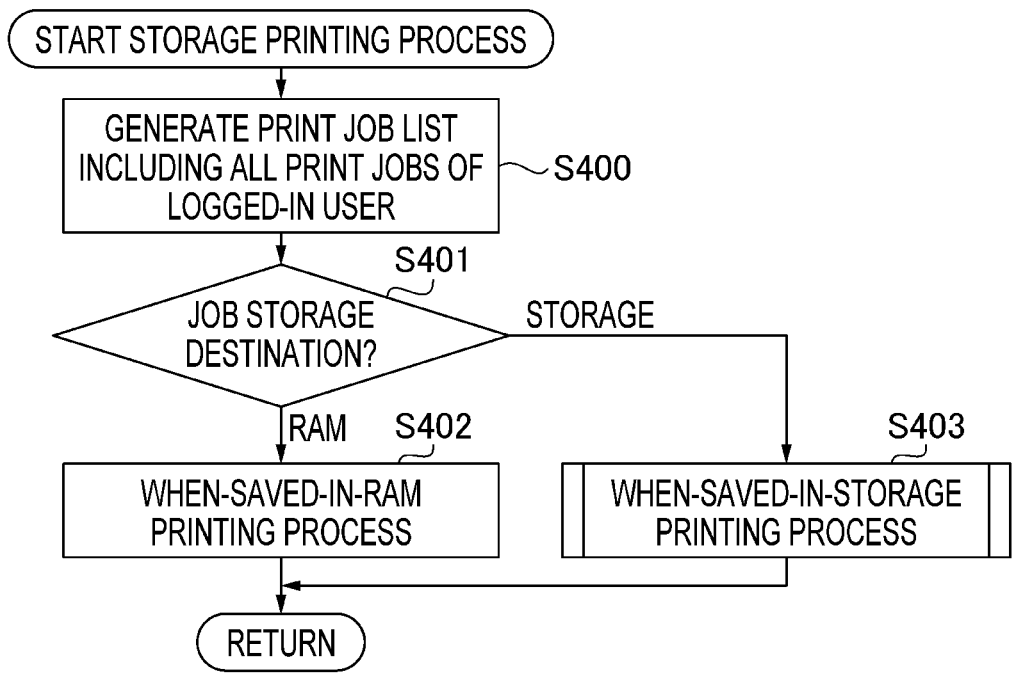
FIG. 5 is a flowchart showing a procedure of a storage printing process included in the process shown in FIG. 4.
Figure 6:
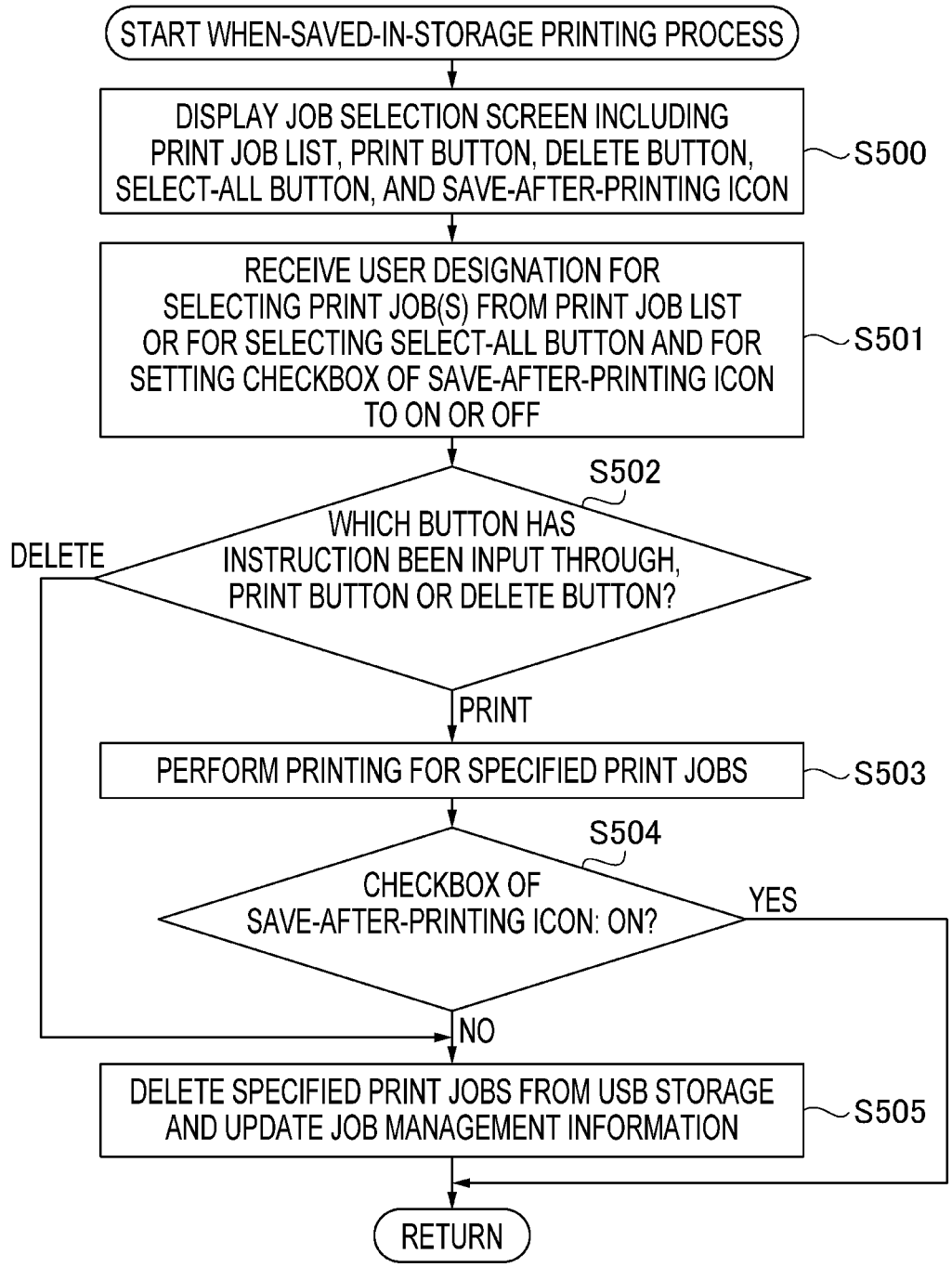
FIG. 6 is a flowchart showing a procedure of a when-saved-in-storage process included in the storage printing process shown in FIG. 5.
Figure 7A:
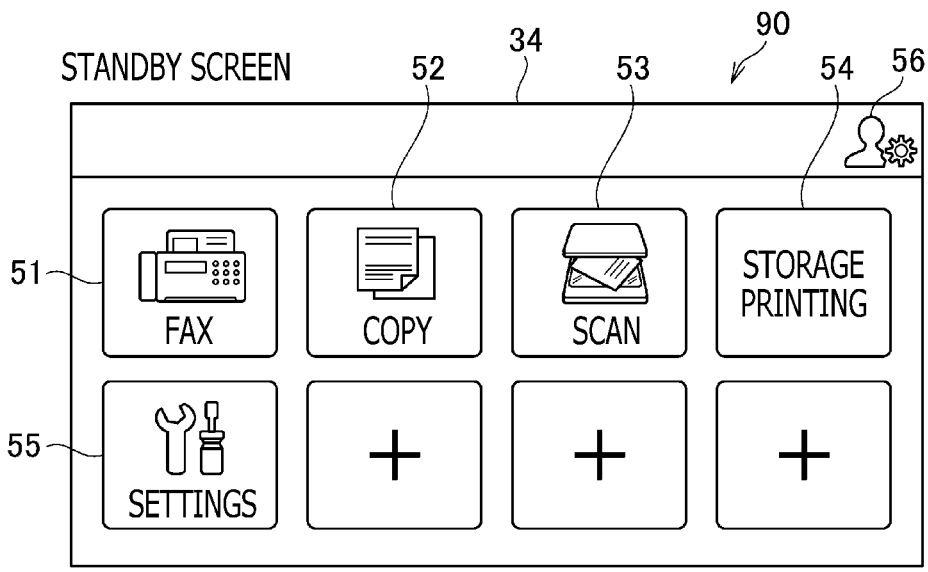
FIG. 7A shows an example of a standby screen.

Next, a flow of the storage printing process will be explained with reference to FIGS. 4 to 7C. In response to a user who has sent a print job from the PC 18 to the MFP 1 operating the home key 35B of the MFP 1, a standby screen 90 as shown in FIG. 7A is displayed on the display 34A of the touch panel 34. The standby screen 90 includes a fax button 51, a copy button 52, a scan button 53, a storage printing button 54, a settings button 55, and a user authentication button 56.

The user authentication button 56 is used when a user attempts to log in to or log out from the MFP 1. When the user authentication button 56 is pressed, the CPU 12 starts a process shown in FIG. 4. In S300 of FIG. 4, the CPU 12 performs an authentication process. The CPU 12 displays a login screen on the display 34A of the touch panel 34 and accepts user identification information and a password input through the physical keys 35. In response to the user identification information and the password being input by the user, the CPU 12 checks the user identification information and the password as input by the user against information stored in advance in an authentication DB 46 stored in the non-volatile memory 15. When the information (i.e., the user identification information and the password) input by the user matches the information stored in advance in the authentication DB 46, the user is allowed to log in to the MFP 1. In response to the user logging in to the MFP 1 (S301: Yes), the CPU 12 proceeds to S302.

In S302, the CPU 12 determines whether there are any print jobs of the logged-in user that are stored in the RAM 13 or in the USB storage 19A. The CPU 12 searches for print jobs associated with the user identification information of the logged-in user from among print jobs stored in the job management information 41 in the RAM 13 or the USB storage 19A. When one or more print jobs associated with the user identification information of the logged-in user have been found as a result of the search (S302: Yes), the CPU 12 proceeds to S303. In S303, the CPU 12 performs the storage printing process. The storage printing process will be described later with reference to FIGS. 5 and 6.

When there are no print jobs associated with the user identification information of the logged-in user in the job management information 41 (S302: No), or after completion of S303, the CPU 12 proceeds to S304. In S304, the CPU 12 displays the standby screen 90 on the display 34A of the touch panel 34. Then, the CPU 12 proceeds to S305.

In S305, the CPU 12 determines whether the storage printing button 54 has been pressed. In response to determining that the storage printing button 54 has been pressed (S305: Yes), the CPU 12 goes back to S302. Meanwhile, in response to determining that the storage printing button 54 has not been pressed (S305: No), the CPU 12 proceeds to S306.

In S306, the CPU 12 determines whether the logged-in user has logged out. When the user has performed a particular operation to log out from the MFP 1 (S306: Yes), the CPU 12 terminates the process shown in FIG. 4. Meanwhile, when the user has not performed a particular operation to log out from the MFP 1 (S306: No), the CPU 12 returns to S305.

Figure 4:
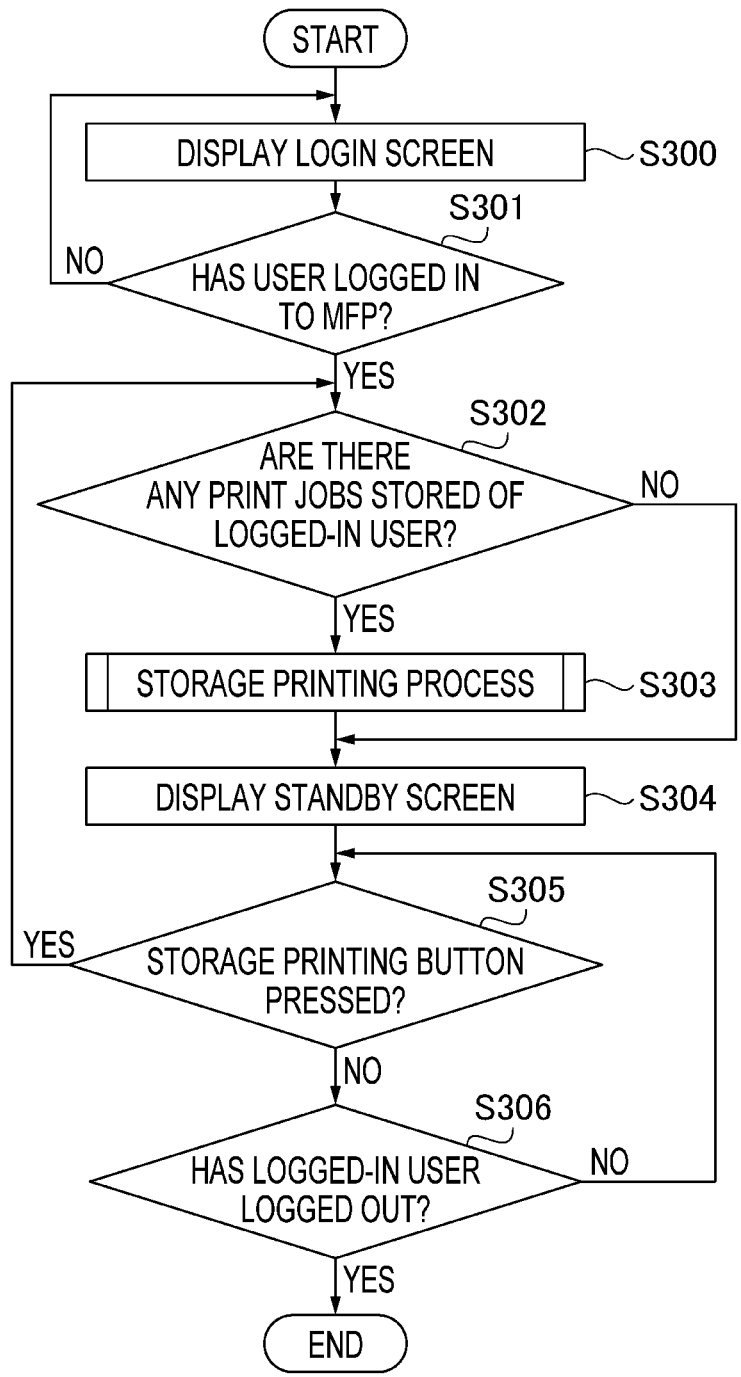
FIG. 4 is a flowchart showing a procedure of a process to perform printing based on print jobs.

The storage printing process to be performed in S303 of FIG. 4 will be described with reference to FIGS. 5 and 6. After starting the process shown in FIG. 5, the CPU 12 obtains information on the print job of the logged-in user from the job management information 41 in S400, and generates a print job list that includes all the user's print jobs. Now suppose for instance that the job management information 41 is as shown in FIG. 14A. It should be noted, however, that the job management information shown in FIG. 14A, as used in an after-mentioned fourth illustrative embodiment according to aspects of the present disclosure, includes a "flag for previous job retention printing" item. Therefore, the job management information 41 in the first illustrative embodiment excludes the "flag for previous job retention printing" item, that is, includes a "job name" item and a "user identification information" item. At this time, if the logged-in user is "User A," the CPU 12 generates a print job list that excludes a print job 6 and includes print jobs 1 to 5. After generating the print job list, the CPU 12 proceeds to S401.

In S401, the CPU 12 determines whether a print job storage destination is the RAM 13 or the USB storage 19A. In response to determining that the print job storage destination is the RAM 13 (S401: RAM), the CPU 12 proceeds to S402. Meanwhile, in response to determining that the print job storage destination is the USB storage 19A (S401: STORAGE), the CPU 12 proceeds to S403.

In S402, the CPU 12 performs a when-saved-in-RAM printing process. Thereafter, the CPU 12 terminates the process shown in FIG. 5. On the other hand, in S403, the CPU 12 performs a when-saved-in-storage printing process. The when-saved-in-storage printing process will be described later with reference to FIG. 6. After completion of the when-saved-in-storage printing process, the CPU 12 terminates the process shown in FIG. 5.

Figure 7B:
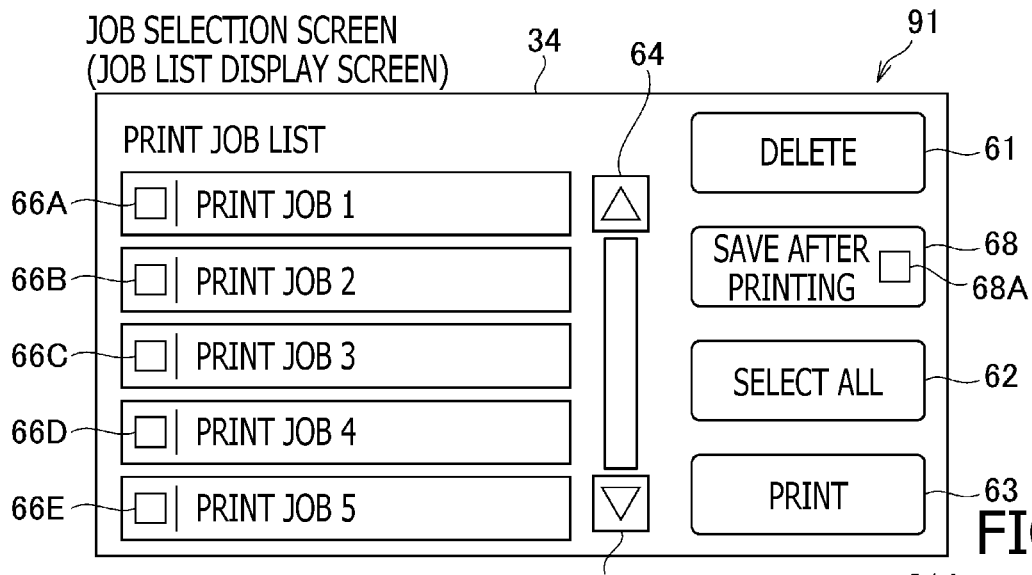
FIG. 7B shows an example of a job selection screen.

First, the when-saved-in-storage printing process will be described with reference to FIG. 6, and then the when-saved-in-RAM printing process will be described. After starting the process shown in FIG. 6, the CPU 12 causes the display 34A of the touch panel 34 to display a job selection screen, which includes a print job list, a print button, a delete button, a select-all button, and a save-after-printing icon in S500. FIG. 7B shows an example of a job selection screen 91 displayed on the display 34A. The job selection screen 91 displays thereon a delete button 61, a select-all button 62, a print button 63, a save-after-printing icon 68, checkboxes 66A to 66E, and scroll buttons 64 and 65. In addition, a checkbox 68A is displayed on the save-after-printing icon 68. On the left side of the job selection screen 91, the print job list generated in S400 is displayed.

When the job selection screen 91 is displayed, the CPU 12 receives, in S501, user designation for selecting print job(s) from the print job list or for selecting the select-all button 62 and for setting the checkbox 68A of the save-after-printing icon 68 to ON or OFF. The CPU 12 receives the user's selection of print job(s) that the user wishes to delete or print via the reception I/F 34B of the touch panel 34 or the physical keys 35. When the user has selected and pressed print job(s) that the user wishes to delete or print from among the print jobs included in the print job list displayed on the job selection screen 91, a check mark is displayed in a corresponding one of the checkboxes 66A to 66E that is located on the left side of each selected print job. When the user has pressed the select-all button 62, the check mark is displayed in each of the checkboxes 66A to 66E of all the print jobs displayed on the job selection screen 91. When the user has pressed the delete button 61 or the print button 63, the selection of the print job(s) is confirmed. The save-after-printing icon 68 is an icon for the user to select either a job retention printing function or a job deletion printing function. The job retention printing function is a function to save, in the USB storage 19A, print jobs for which printing has been completed. The job deletion printing function is a function to delete, from the USB storage 19A, print jobs for which printing has been completed. Each time the user specifies the save-after-printing icon 68, the display state of the check mark in the checkbox 68A is repeatedly switched from one state to another between an ON state where the check mark is displayed and an OFF state where the check mark is not displayed. The ON state where the check mark is displayed in the checkbox 68A indicates that the job retention printing is selected. The OFF state where the check mark is not displayed in the checkbox 68A indicates that the job deletion printing is selected. Hereinafter, the job retention printing function and the job deletion printing function may be simply referred to as the job retention printing and the job deletion printing, respectively.

Subsequently, in S502, the CPU 12 determines whether an instruction has been input through the print button 63 or through the delete button 61. The print button 63 is configured to, when operated, provide an instruction to print images based on the image data 42 for the print job(s) selected by the user. The delete button 61 is configured to, when operated, provide an instruction to delete the print job(s). In response to receiving an instruction input through the print button 63 on the job selection screen 91 (S502: PRINT), the CPU 12 proceeds to S503.

In S503, the CPU 12 performs a printing process. The CPU 12 controls the print engine 2 to print images based on the image data 42 for the print jobs specified by the user on the job selection screen 91. When printing has been completed for all the print jobs specified on the job selection screen 91, the CPU 12 proceeds to S504.

In S504, the CPU 12 determines whether the checkbox 68A of the save-after-printing icon 68 is set to ON, i.e., whether the save-after-printing icon 68 is set to specify the job retention printing. In response to determining in S504 that the save-after-printing icon 68 is set to specify the job retention printing (S504: Yes), i.e., when the check mark is displayed in the checkbox 68A, the CPU 12 terminates the process shown in FIG. 6. Thereby, the specified print jobs remain stored in the USB storage 19A even after printing.

On the other hand, in response to determining in S504 that the save-after-printing icon 68 is set to specify the job deletion printing (S504: No), i.e., when the check mark is not displayed in the checkbox 68A, the CPU 12 proceeds to S505.

In S505, the CPU 12 deletes the print jobs specified on the job selection screen 91 from the USB storage 19A, deletes information on the specified print jobs from the job management information 41, and stores in the USB storage 19A the job management information 41 from which the information on the specified print jobs has been deleted. Thereby, the specified print jobs are deleted from the USB storage 19A after printing. After thus updating the job management information 41, the CPU 12 terminates the process shown in FIG. 6.

In response to receiving an instruction input through the delete button 61 on the job selection screen 91 (S502: DELETE), the CPU 12 proceeds to S505. As a result, all the print jobs specified on the job selection screen 91 are deleted from the USB storage 19A without printing based on them.

Figure 7C:
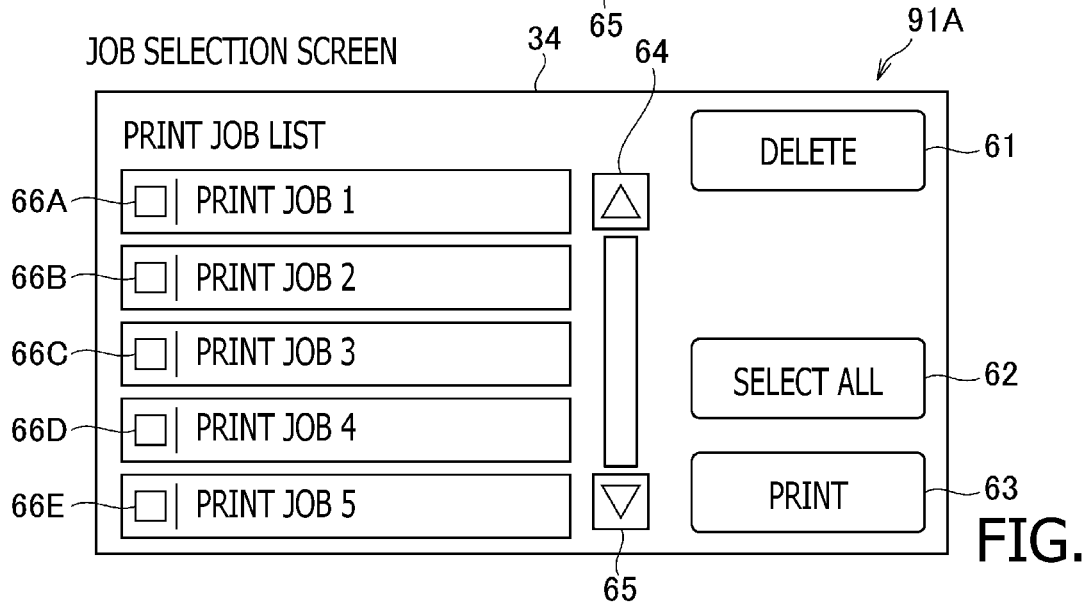
FIG. 7C shows another example of the job selection screen.

In S402, the when-saved-in-RAM printing process to be performed by the CPU 12 is realized by partially modifying the aforementioned when-saved-in-storage printing process. Specifically, the CPU 12 first displays a job selection screen corresponding to the job selection screen displayed in S500 from which the save-after-printing icon is removed. FIG. 7C shows an example of a job selection screen 91A displayed on the display 34A. The job selection screen 91A differs from the job selection screen 91 shown in FIG. 7B only in that the save-after-printing icon 68 is not displayed thereon. Next, the CPU 12 performs a process corresponding to the process in S501 from which an operation to the save-after-printing icon 68 is excluded, i.e., receives user designation for selecting print job(s) from the print job list or for selecting the select-all button 62. The CPU 12 then performs a process corresponding to the process of S502 to S505 from which the determination in S504 is excluded. Thus, the when-saved-in-RAM printing process is achieved.

The reason why the save-after-printing icon 68 is not displayed on the job selection screen 91A in the when-saved-in-RAM printing process is to prevent the job retention printing function from being selected through the save-after-printing icon 68. Namely, if the job retention printing is specified for print job(s) stored in the RAM 13, the user may not be able to handle a problem or situation in which the print job(s) stored in the RAM 13 are deleted, for instance, when the MFP 1 is turned off. Therefore, in a printing process based on the print job(s) stored in the RAM 13, the save-after-printing icon 68 is not displayed, thereby preventing the job retention printing from being selected from the beginning.

As described above, the MFP 1 of the first illustrative embodiment includes the reception I/F 34B configured to receive user input operations, the display 34A, the print engine 2 configured to print images on sheets, the USB storage 19A configured to store print jobs, and the CPU 12. The MFP 1 is enabled to select either the job retention printing or the job deletion printing. In the job retention printing, the MFP 1 causes the print engine 2 to print images based on print jobs on sheets, and thereafter retains the print jobs for which printing has been completed in the USB storage 19A. In the job deletion printing, the MFP 1 causes the print engine 2 to print images based on print jobs on sheets, and thereafter deletes the print jobs for which printing has been completed from the USB storage 19A.

The CPU 12 is configured to perform a display process. In the display process, the CPU 12 causes the display 34A to display the print jobs stored in the USB storage 19A, and the save-after-printing icon 68 for selecting either the job retention printing function or the job deletion printing function. The CPU 12 is further configured to perform a selection process. In the selection process, the CPU 12 selects one or more print jobs from among the print jobs displayed on the display 34A in the display process, and selects a function specified by the save-after-printing icon 68 from the job retention printing function and the job deletion printing function. The CPU 12 is further configured to perform a printing process to cause the print engine 2 to print images based on the one or more print jobs selected in the selection process. The CPU 12 is further configured to perform a retention/deletion process. In the retention/deletion process, the CPU 12 retains the one or more print jobs for which printing has been completed in the USB storage 19A after the printing process, when the job retention printing is selected in the selection process. Meanwhile, in the retention/deletion process, the CPU 12 deletes the one or more print jobs for which printing has been completed from the USB storage 19A after the printing process, when the job deletion printing is selected in the selection process.

Thus, the MFP 1 of the first illustrative embodiment is configured to select either the job retention printing or the job deletion printing, prior to printing based on one or more print jobs as selected. Therefore, the user is allowed to select whether to store the one or more print jobs after printing, prior to causing the MFP 1 to perform printing based on the one or more print jobs as selected.

In the first illustrative embodiment, the MFP 1 may be an example of the "printing apparatus" according to aspects of the present disclosure. The USB storage 19A may be an example of the "storage" according to aspects of the present disclosure. The CPU 12 may be an example of the "controller" according to aspects of the present disclosure. The save-after-printing icon 68 may be an example of an "operable selection object" according to aspects of the present disclosure.

Second Illustrative Embodiment

Next, a second illustrative embodiment according to aspects of the present disclosure will be described. The second illustrative embodiment differs from the aforementioned first illustrative embodiment in that the display wording of the print button 63 displayed on the job selection screen 91 is changed according to which is selected between the job retention printing and the job deletion printing. Since the second illustrative embodiment is realized by merely changing a part of the when-saved-in-storage printing process described in the aforementioned first illustrative embodiment, the following description will focus on the part to be changed, and detailed explanation of the other parts may be omitted. The hardware elements described above with reference to FIGS. 1 and 2 shall be used as they are in the second illustrative embodiment.

Figure 8A:
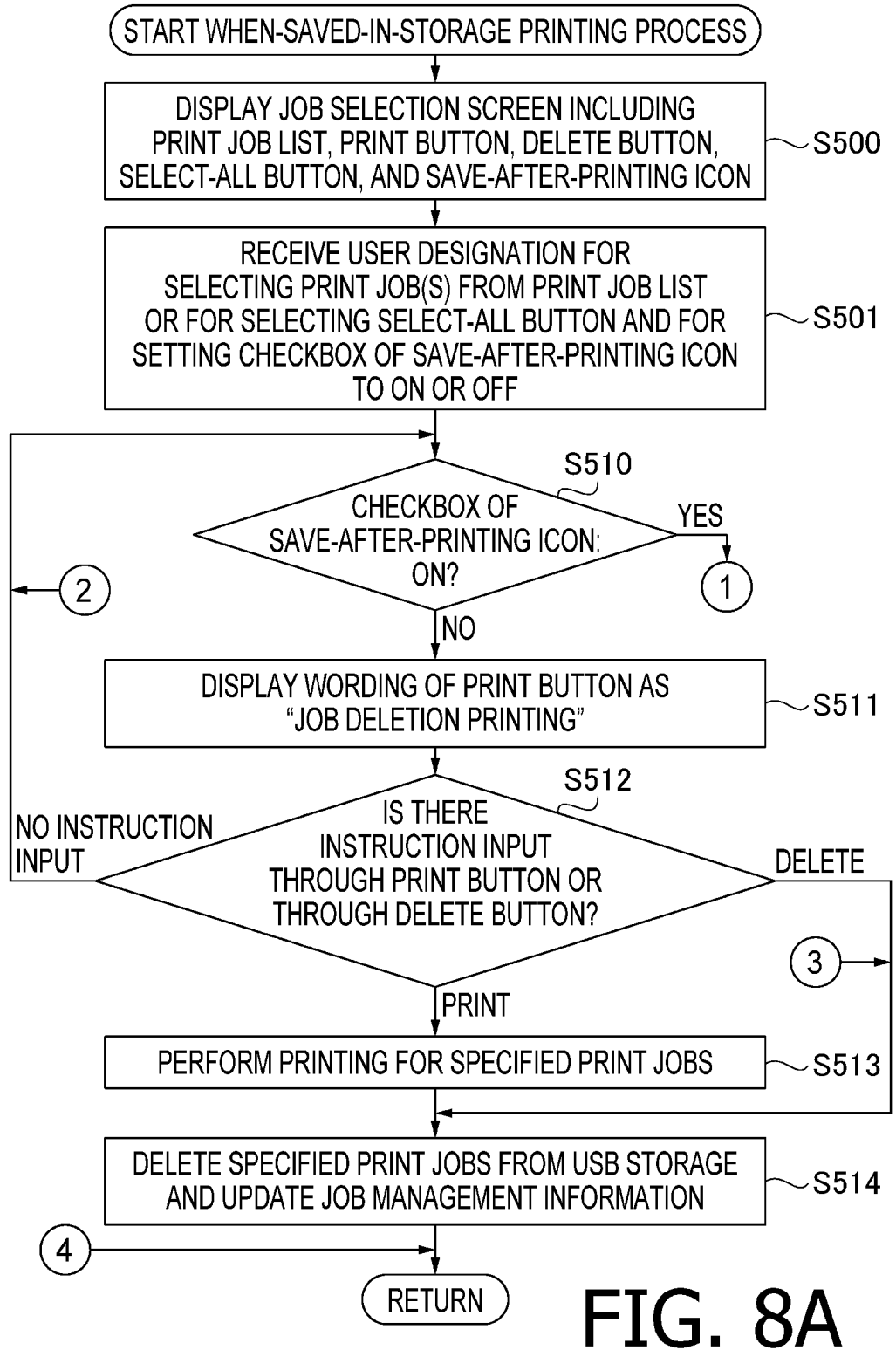
FIGS. 8A and 8B are flowcharts showing a procedure of a when-saved-in-storage process.
Figure 8B:
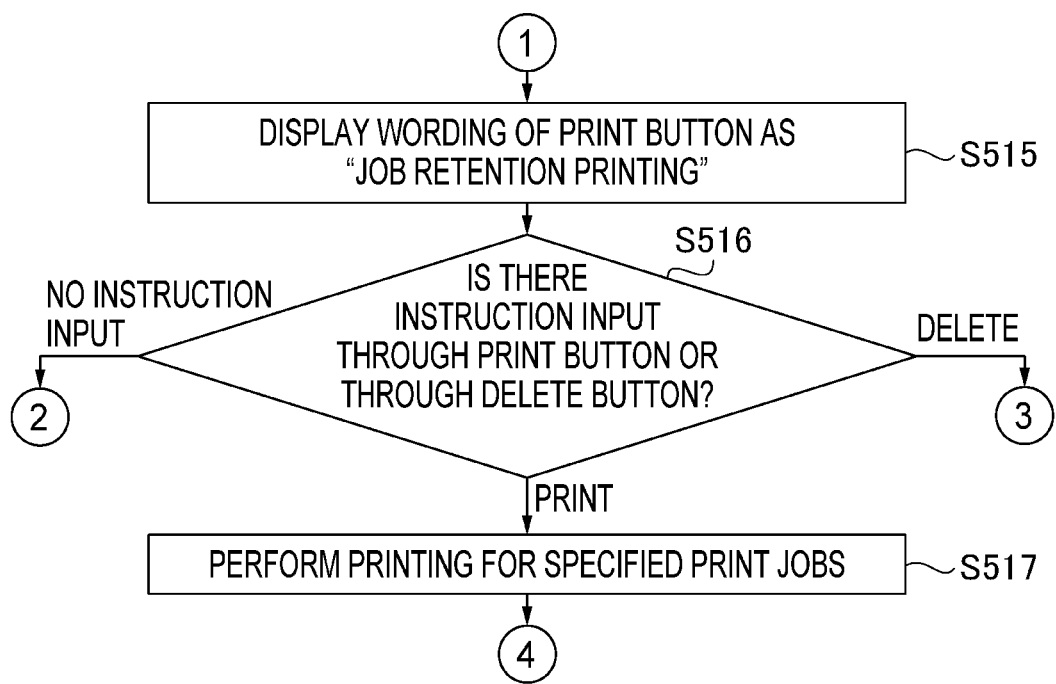

FIGS. 8A and 8B are flowcharts showing a procedure of the when-saved-in-storage printing process to be performed by the CPU 12 in the second illustrative embodiment. In FIGS. 8A and 8B, substantially the same steps (i.e., the steps in which substantially the same processes are performed) as in FIG. 6 will be provided with the same reference characters, and detailed explanations thereof may be omitted. After starting the process shown in FIGS. 8A and 8B and then executing substantially the same processes as in the above steps S500 and S501, the CPU 12 determines in S510 whether the checkbox 68A of the save-after-printing icon 68 is set to ON, i.e., whether the save-after-printing icon 68 is set to specify the job retention printing, in substantially the same manner as in the above step S504. In response to determining in S510 that the save-after-printing icon 68 is set to specify the job deletion printing (S510: No), i.e., when the check mark is not displayed in the checkbox 68A, the CPU 12 proceeds to S511.

Figure 9A:
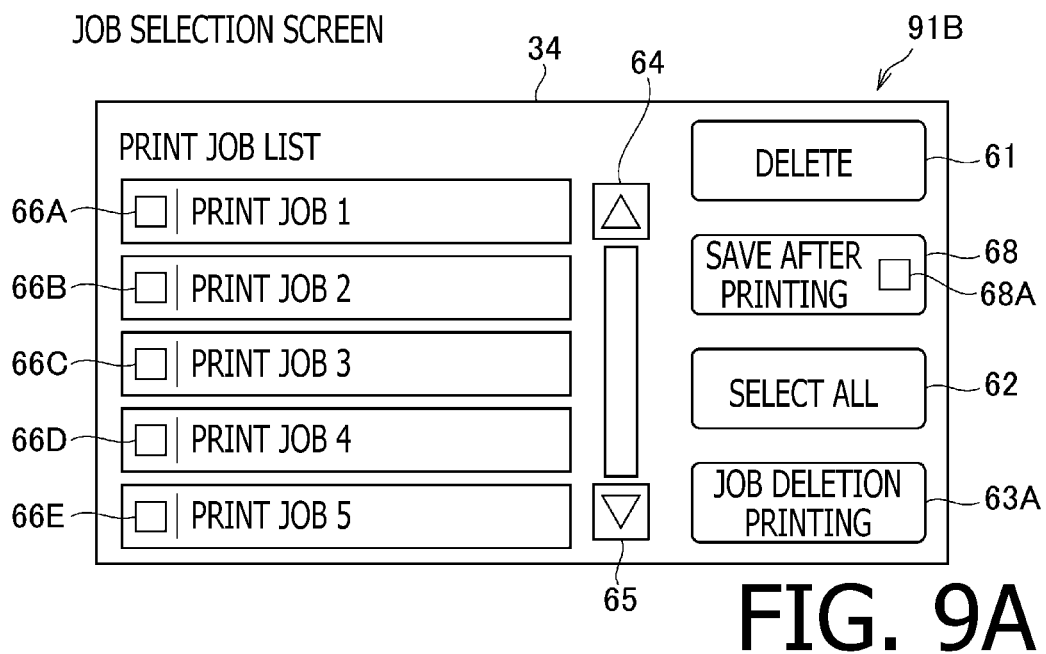
FIG. 9A shows an example of a job selection screen.

In S511, the CPU 12 displays the wording of the print button as "JOB DELETION PRINTING." FIG. 9A shows an example of a job selection screen 91B displayed on the display 34A at this time. On the job selection screen 91B, a job deletion printing button 63A is displayed instead of the print button 63.

Subsequently, in S512, the CPU 12 determines whether there is an instruction input through the print button (in this case, the job deletion print button 63A), an instruction input through the delete button 61, or no instruction input. The job deletion print button 63A is a button for providing an instruction to delete the print job(s) selected by the user from the USB storage 19A after printing the images based on the image data 42 for the selected print job(s). In response to determining that an instruction has been input through the job deletion print button 63A on the job selection screen 91B (S512: PRINT), the CPU 12 proceeds to S513.

In S513, the CPU 12 performs a printing process in substantially the same manner as in the above step S503. The CPU 12 controls the print engine 2 to print the images based on the image data 42 for the print jobs specified by the user on the job selection screen 91B. When printing has been completed for all the print jobs specified on the job selection screen 91B, the CPU 12 proceeds to S514.

In S514, the CPU 12 deletes the print jobs specified on job selection screen 91B from USB storage 19A. The CPU 12 deletes the image data 42 of the print jobs specified on the job selection screen 91B from the USB storage 19A, deletes the information on the specified print jobs from the job management information 41, and stores in the USB storage 19A the job management information 41 from which the information on the specified print jobs has been deleted. After thus updating the job management information 41, the CPU 12 terminates the process shown in FIGS. 8A and 8B.

In response to determining in S512 that an instruction has been input through the delete button 61 (S512: DELETE), the CPU 12 proceeds to S514. In response to determining in S512 that there is no instruction input (S512: No Instruction Input), the CPU 12 goes back to S510.

On the other hand, in response to determining in S510 that the save-after-printing icon 68 is set to specify the job retention printing (S510: Yes), i.e., when the check mark is displayed in the checkbox 68A, the CPU 12 proceeds to S515.

Figure 9B:
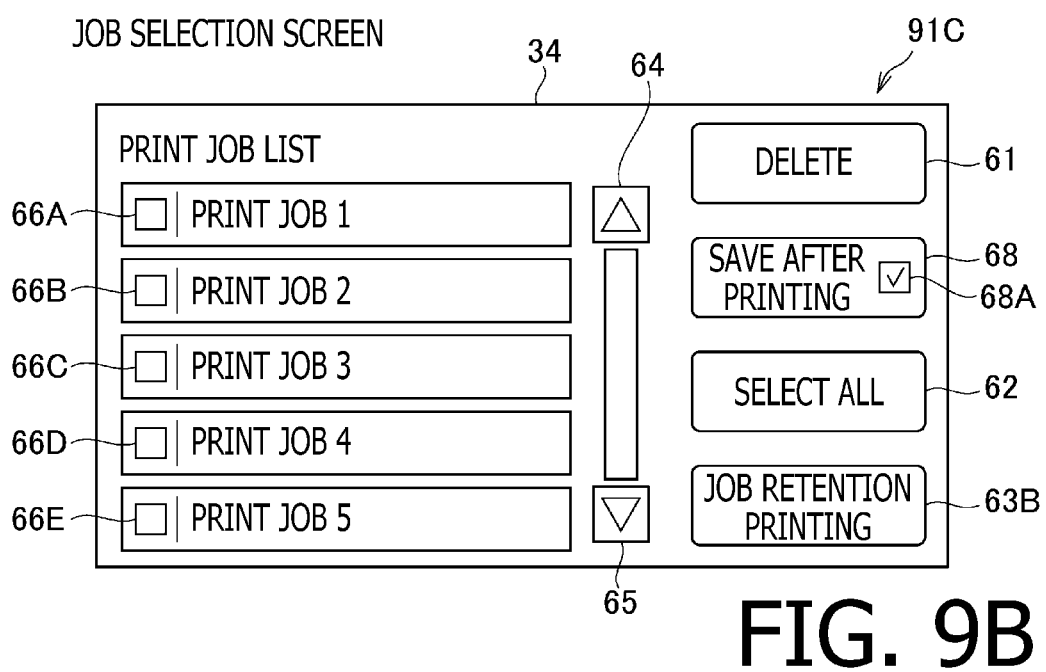
FIG. 9B shows another example of the job selection screen.

In S515, the CPU 12 displays the wording of the print button as "Job Retention Printing." FIG. 9B shows an example of a job selection screen 91C displayed on the display 34A at this time. The job selection screen 91C displays a job retention printing button 63B.

Subsequently, in S516, the CPU 12 determines whether there is an instruction input through the print button (in this case, the job retention printing button 63B), an instruction input through the delete button 61, or no instruction input.

The job retention printing button 63B is a button for providing an instruction to store the print job(s) selected by the user in the USB storage 19A after printing the images based on the image data 42 for the selected print job(s). In response to determining that an instruction has been input through the job retention printing button 63B on the job selection screen 91C (S516: PRINT), the CPU 12 proceeds to S517.

In S517, the CPU 12 performs a printing process in substantially the same manner as in the above step S503. The CPU 12 controls the print engine 2 to print the images based on the image data 42 for the print jobs selected by the user on the job selection screen 91C. When printing has been completed for all the print jobs specified on the job selection screen 91C, the CPU 12 terminates the process shown in FIGS. 8A and 8B.

In response to determining in S516 that an instruction has been input through the delete button 61 (S516: DELETE), the CPU 12 proceeds to S514. In response to determining in S516 that there is no instruction input (S516: No Instruction Input), the CPU 12 goes back to S510.

As described above, the MFP 1 of the second illustrative embodiment includes the reception I/F 34B configured to receive user input operations, the display 34A, the print engine 2 configured to print images on sheets, the USB storage 19A configured to store print jobs, and the CPU 12. The MFP 1 is enabled to select either the job retention printing or the job deletion printing. In the job retention printing, the MFP 1 causes the print engine 2 to print images based on print jobs on sheets, and thereafter retains the print jobs for which printing has been completed in the USB storage 19A. In the job deletion printing, the MFP 1 causes the print engine 2 to print images based on print jobs on sheets, and thereafter deletes the print jobs for which printing has been completed from the USB storage 19A.

The display 34A is included in the touch panel 34 having the reception I/F 34B. The save-after-printing icon 68 is a selection icon for allowing the user to select either the job retention printing or the job deletion printing. In the display process, the CPU 12 causes the display 34A to display the job retention printing button 63B when the job retention printing is selected through the save-after-printing icon 68. Meanwhile, in the display process, the CPU 12 causes the display 34A to display the job deletion printing button 63A when the job deletion printing is selected through the save-after-printing icon 68. In response to the job retention printing button 63B being operated according to an input operation received via the reception I/F 34B, the CPU 12 performs the printing process based on print jobs, and thereafter, in the retention/deletion process, the CPU 12 retains the print jobs for which the printing process has been completed in the USB storage 19A. In response to the job deletion printing button 63A being operated according to an input operation received via the reception I/F 34B, the CPU 12 performs the printing process based on print jobs, and thereafter, in the retention/deletion process, the CPU 12 deletes the print jobs for which the printing process has been completed from the USB storage 19A.

Thus, the MFP 1 of the second illustrative embodiment is configured to select either the job retention printing or the job deletion printing, prior to printing based on one or more print jobs as selected. Further, the MFP 1 is configured to display the job retention printing button 63B when the job retention printing is selected, and display the job deletion printing button 63A when the job deletion printing is selected. Thereby, the user is allowed to select whether to store the one or more print jobs after printing, prior to printing based on the one or more print jobs as selected.

Moreover, the user is allowed to provide a print instruction while visually checking which is selected between the job retention printing and the job deletion printing.

Third Illustrative Embodiment

Next, a third illustrative embodiment according to aspects of the present disclosure will be described. The third illustrative embodiment differs from the aforementioned first illustrative embodiment in that the job deletion printing button 63A and the job retention printing button 63B are displayed instead of the save-after-printing icon 68 and the print button 63 displayed on the job selection screen 91 in the first illustrative embodiment. Since the third illustrative embodiment is realized by merely changing a part of the when-saved-in-storage printing process described in the aforementioned first illustrative embodiment, the following description will focus on the part to be changed, and detailed explanations of the other parts may be omitted. The hardware elements described above with reference to FIGS. 1 and 2 shall be used as they are in the third illustrative embodiment.

Figure 10:
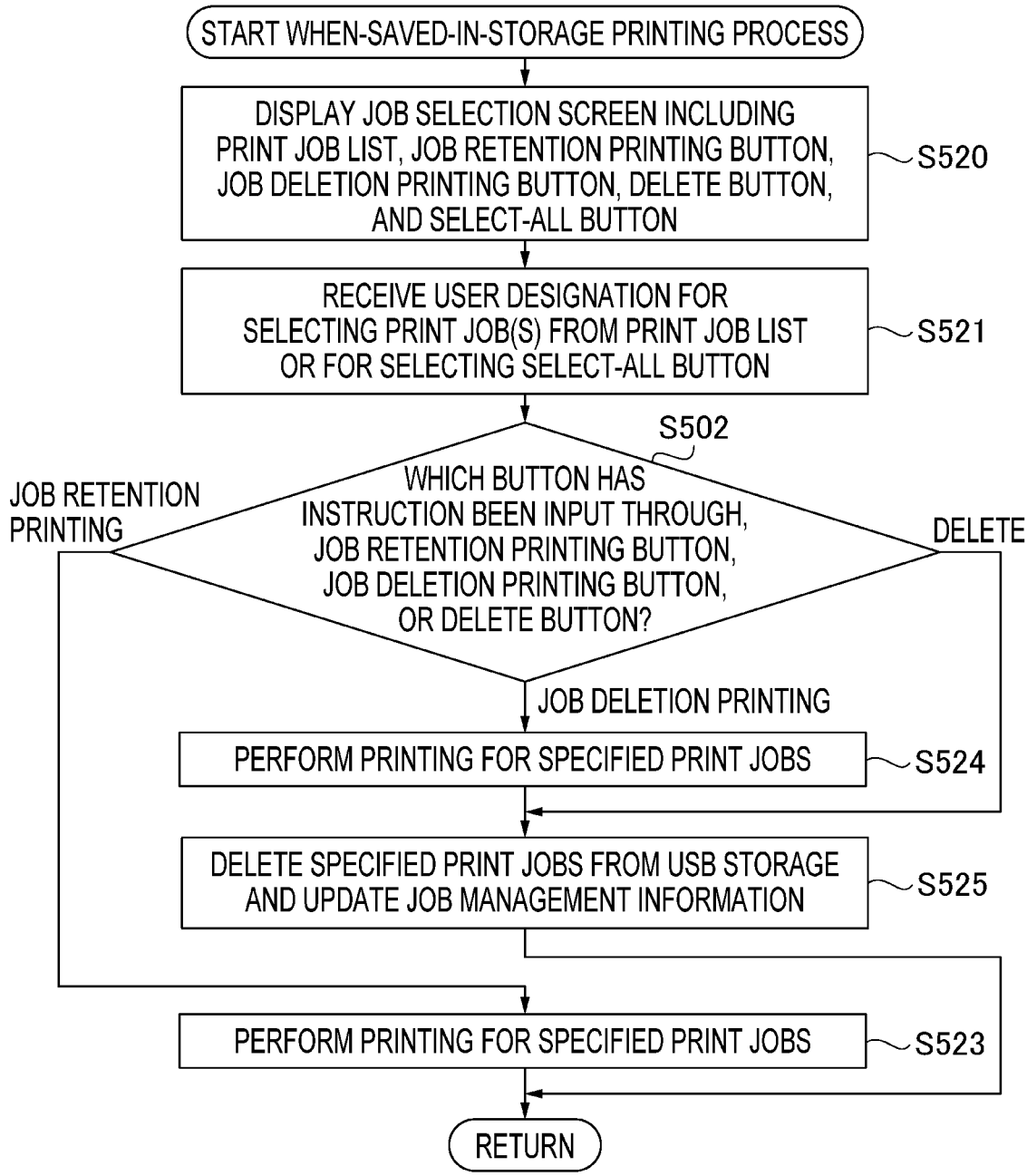
FIG. 10 is a flowchart showing a procedure of a when-saved-in-storage process.
Figure 11A:
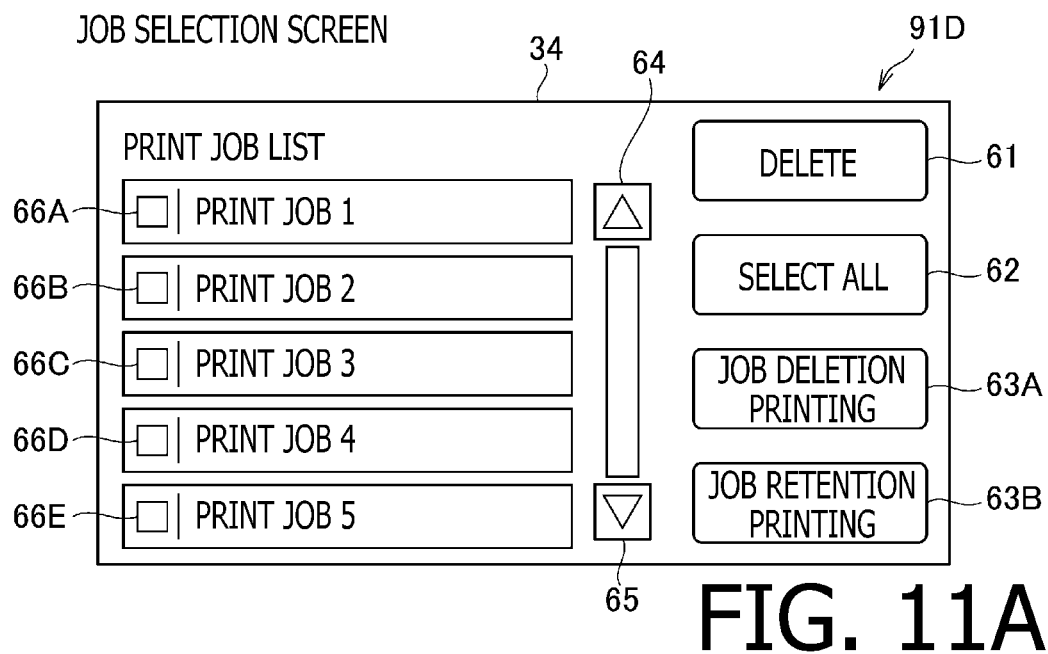
FIG. 11A shows an example of a job selection screen.

FIG. 10 is a flowchart showing a procedure of the when-saved-in-storage printing process to be executed by the CPU 12 in the third illustrative embodiment. After starting the process shown in FIG. 10, in S520, the CPU 12 displays a job selection screen that includes a print job list, a job retention printing button, a job deletion printing button, a delete button, and a select-all button on the display 34A of the touch panel 34. FIG. 11A shows an example of a job selection screen 91D displayed on the display 34A. The job selection screen 91D differs from the job selection screen 91 shown in FIG. 7B only in that the job deletion printing button 63A and the job retention printing button 63B are displayed instead of the save-after-printing icon 68 and the print button 63.

After displaying the job selection screen 91D, the CPU 12 receives user designation for selecting print job(s) from the print job list or for selecting the select-all button 62.

Subsequently, in S522, the CPU 12 determines whether an instruction has been input through the job retention printing button 63B, through the job deletion printing button 63A, or through the delete button 61. In response to determining that an instruction has been input through the job retention printing button 63B (S522: JOB RETENTION PRINTING) on the job selection screen 91D, the CPU 12 proceeds to S523.

In S523, the CPU 12 performs a printing process in substantially the same manner as in the above step S503. When printing has been completed for all the print jobs specified on the job selection screen 91D, the CPU 12 terminates the process shown in FIG. 10.

On the other hand, in response to determining in S522 that an instruction has been input through the job deletion printing button 63A on the job selection screen 91D (S522: JOB DELETION PRINTING), the CPU 12 proceeds to S524.

In S524, the CPU 12 performs a printing process in substantially the same manner as in S523. Then, in S525, the CPU 12 deletes the print jobs specified on the job selection screen 91D from the USB storage 19A in substantially the same manner as in the above step S505. The CPU 12 deletes the image data 42 of the print jobs specified on the job selection screen 91D from the USB storage 19A, deletes information on the specified print jobs from the job management information 41, and stores in the USB storage 19A the job management information 41 from which the information on the specified print jobs has been deleted. After thus updating the job management information 41, the CPU 12 terminates the process shown in FIG. 10.

When there is an instruction input through the delete button 61 on the job selection screen 91D (S522: DELETE), the CPU 12 proceeds to S525.

As described above, the MFP 1 of the third illustrative embodiment includes the reception I/F 34B configured to receive user input operations, the display 34A, the print engine 2 configured to print images on sheets, the USB storage 19A configured to store print jobs, and the CPU 12. The MFP 1 is enabled to select either the job retention printing or the job deletion printing. In the job retention printing, the MFP 1 causes the print engine 2 to print images based on print jobs on sheets, and thereafter retains the print jobs for which printing has been completed in the USB storage 19A. In the job deletion printing, the MFP 1 causes the print engine 2 to print images based on print jobs on sheets, and thereafter deletes the print jobs for which printing has been completed from the USB storage 19A.

The display 34A is included in the touch panel 34 having the reception I/F 34B. The print buttons displayed on the display 34A include the job retention printing button 63B indicating the job retention printing and the job deletion printing button 63A indicating the job deletion printing. In response to the job retention printing button 63B being operated according to an input operation received via the reception I/F 34B, the CPU 12 performs the printing process, and thereafter, in the retention/deletion process, retains the print jobs for which the printing process has been completed in the USB storage 19A. In response to the job deletion printing button 63B being operated according to an input operation received via the reception I/F 34B, the CPU 12 performs the printing process, and thereafter, in the retention/deletion process, deletes the print jobs for which the printing process has been completed from the USB storage 19A.

Thus, the MFP 1 of the third illustrative embodiment is configured to, prior to printing based on one or more print jobs as selected, cause the display 34A to display the job retention printing button 63B and the job deletion printing button 63A. Further, the MFP 1 is configured to select either the job retention printing or the job deletion printing in response to one of the print buttons 63B and 63A being operated. Thereby, the user is allowed to select whether to store the one or more print jobs after printing, prior to printing based on the one or more print jobs as selected. Further, the user is allowed to provide a print instruction after proactively specifying either the job retention printing or the job deletion printing.

Fourth Illustrative Embodiment

Next, a fourth illustrative embodiment according to aspects of the present disclosure will be described. The fourth illustrative embodiment differs from the aforementioned first embodiment in that the MFP 1 is enabled to selectively perform either the job retention printing or the job deletion printing for each of the print jobs included in the print job list, instead of displaying the save-after-printing icon 68 on the job selection screen 91. Since the fourth illustrative embodiment is realized by merely changing a part of the when-saved-in-storage printing process described in the aforementioned first illustrative embodiment, the following description will focus on the part to be changed, and detailed explanations of the other parts may be omitted.

The hardware elements described above with reference to FIGS. 1 and 2 shall be used as they are in the fourth illustrative embodiment.

Figure 11B:
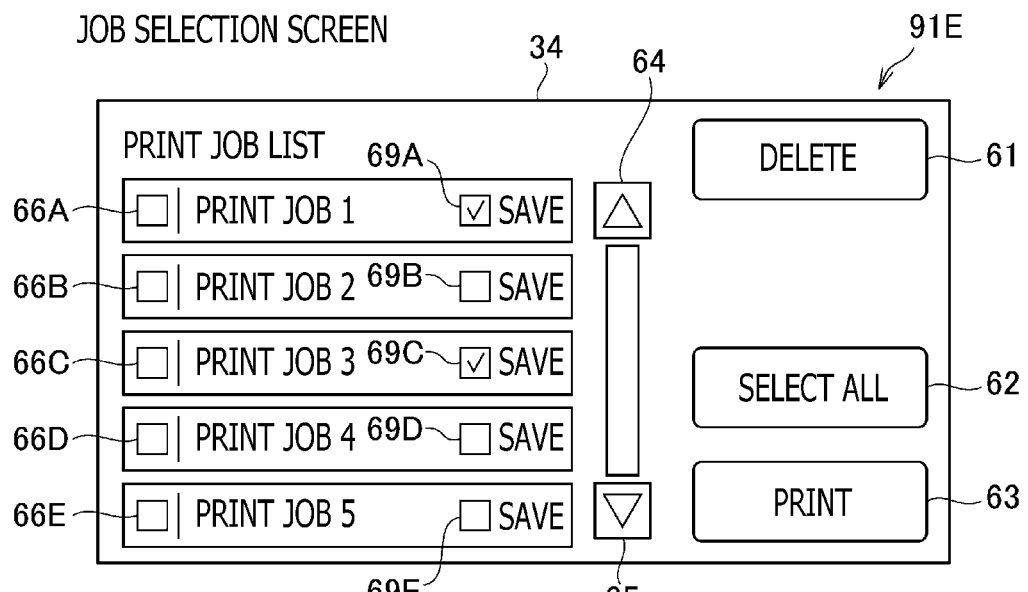
FIG. 11B shows another example of the job selection screen.
Figure 12A:
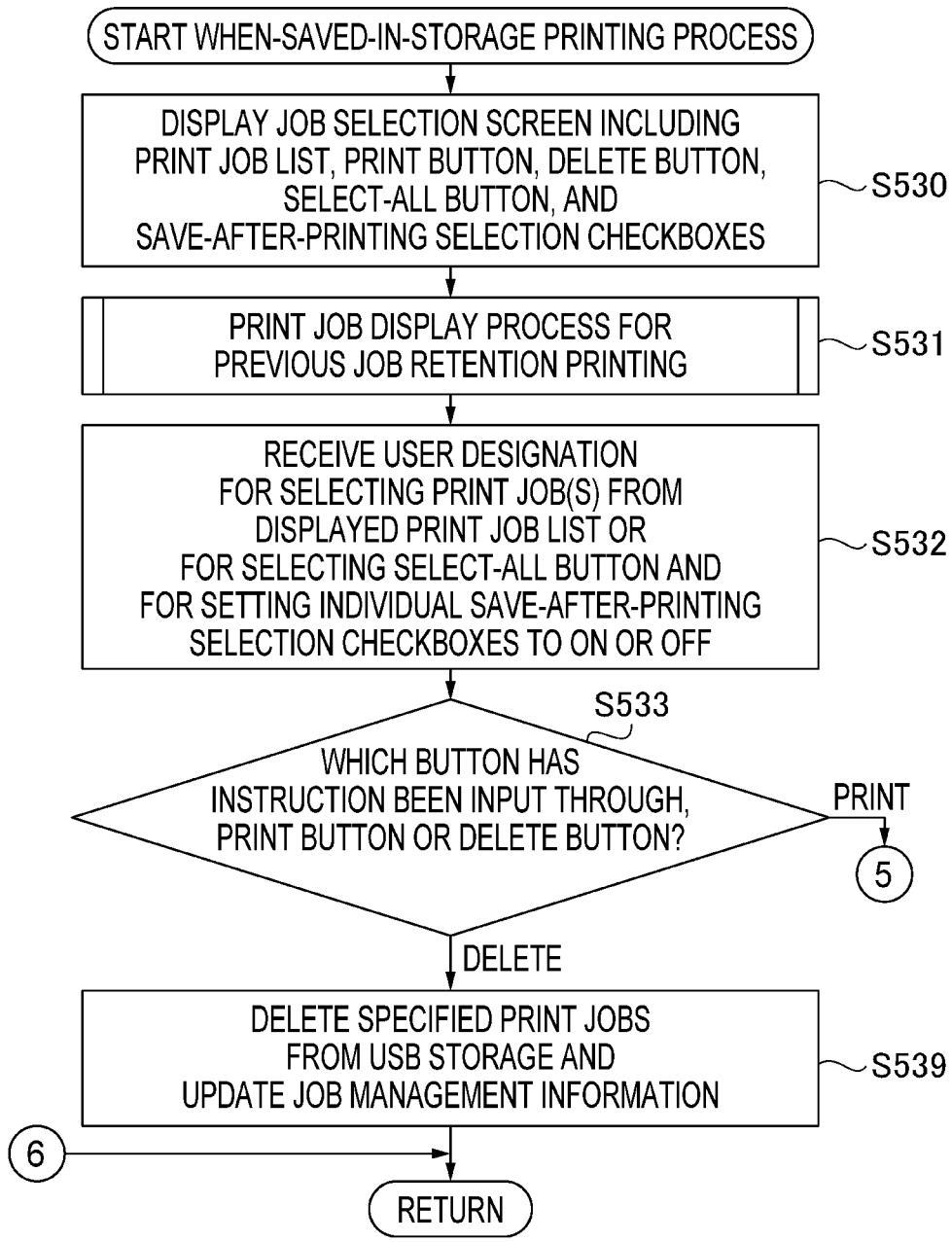
FIGS. 12A and 12B are flowcharts showing a procedure of a when-saved-in-storage process.
Figure 12B:
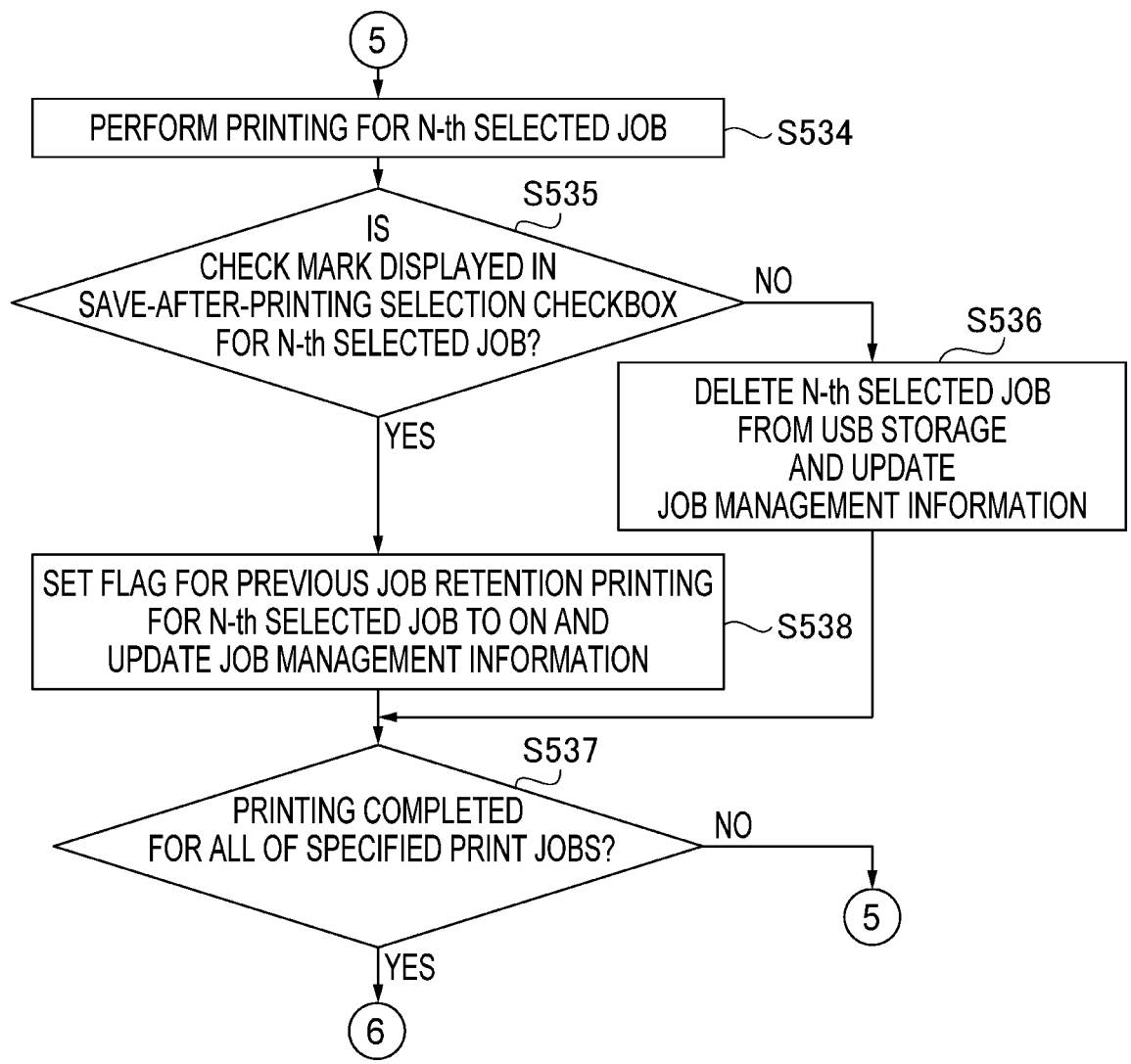

FIGS. 12A and 12B are flowcharts showing a procedure of the when-saved-in-storage printing process to be performed by the CPU 12 in the fourth illustrative embodiment. After starting the process shown in FIGS. 12A and 12B, in S530, the CPU 12 causes the display 34A of the touch panel 34 to display a job selection screen that includes a print job list, a print button, a delete button, a select-all button, and save-after-printing selection checkboxes. FIG. 11B shows an example of a job selection screen 91E displayed on the display 34A. The job selection screen 91E differs from the job selection screen 91 shown in FIG. 7B only in that the job selection screen 91E displays thereon save-after-printing selection checkboxes 69A-69E for individual print jobs included in the print job list, instead of the save-after-printing icon 68 displayed on the job selection screen 91.

Subsequently, in S531, the CPU 12 performs a print job display process for previous job retention printing. The print job display process for previous job retention printing will be described later with reference to FIG. 13.

Subsequently, in S532, the CPU 12 receives user designation for selecting print job(s) from the print job list or for selecting the select-all button 62 and for setting the individual save-after-printing selection checkboxes 69A to 69E to ON or OFF. The save-after-printing selection checkboxes 69A to 69E are checkboxes for allowing the user to select either the job retention printing or the job deletion printing for each print job displayed in the print job list. Each time the user specifies each of the save-after-printing selection checkboxes 69A to 69E, the display state of the check mark in each save-after-printing selection checkbox 69A to 69E is repeatedly switched from one state to another between an ON state where the check mark is displayed and an OFF state where the check mark is not displayed. The ON state where the check mark is displayed in each save-after-printing selection checkbox 69A to 69E indicates that the job retention printing is selected. The OFF state where the check mark is not displayed in each save-after-printing selection checkbox 69A to 69E indicates that the job deletion printing is selected.

Subsequently, in S533, the CPU 12 determines whether an instruction has been input through the print button 63 or through the delete button 61. In response to determining that an instruction has been input through the print button 63 on the job selection screen 91E (S533: PRINT), the CPU 12 proceeds to S534.

In S534, the CPU 12 performs a printing process for an N-th selected job among the print jobs specified from the print job list. Here, "N" is a count value indicated by a counter N for identifying each of the print jobs specified from the print job list. The value of "N" varies, for instance, from an initial value of "1" up to the number of the print jobs specified from the print job list.

After the printing process in S534 has been completed, in S535, the CPU 12 determines whether the check mark is displayed in the save-after-printing selection checkbox corresponding to the N-th selected job. In response to determining in S535 that the check mark is not displayed in the save-after-printing selection checkbox for the N-th selected job (S535: No), that is, when the job deletion printing is selected for the N-th selected job, the CPU 12 proceeds to S536.

In S536, the CPU 12 deletes the N-th selected job from the USB storage 19A, deletes information about the N-th selected job from the job management information 41, and stores in the USB storage 19A the job management information 41 from which the information about the N-th selected job has been deleted. After thus updating the job management information 41, the CPU 12 proceeds to S537.

On the other hand, in response to determining in S535 that the check mark is displayed in the save-after-printing selection checkbox for the N-th selected job (S535: Yes), that is, when the job retention printing is selected for the N-th selected job, the CPU 12 proceeds to S538.

In S538, the CPU 12 sets a flag for previous job retention printing for the N-th selected job to ON and updates the job management information 41. Then, the CPU 12 proceeds to S537. FIGS. 14A and 14B show examples of the job management information 41. The job management information 41 shown in FIGS. 14A and 14B includes the flag for previous job retention printing, in addition to the job name and the user identification information included in each received print job. The flag for previous job retention printing is set to ON when the corresponding print job is a job for which previous job retention printing is specified. An initial value of the flag for previous job retention printing is OFF.

In S537, the CPU 12 determines whether the printing process in S534 has been completed for all the print jobs specified from the print job list. In response to determining in S537 that one or more print jobs remain to be printed (S537: No), the CPU 12 returns to S534. At this time, the CPU 12 increments the counter N by "1." Meanwhile, in response to determining in S537 that no print job remains to be printed (S537: Yes), the CPU 12 terminates the process shown in FIGS. 12A and 12B.

On the other hand, in response to determining in S533 that an instruction has been input through the delete button 61 on the job selection screen 91E (S533: DELETE), the CPU 12 proceeds to S539. In S539, in substantially the same manner as in the above step S505, the CPU 12 deletes the print jobs selected on the job selection screen 91E from the USB storage 19A, deletes information on the selected print jobs from the job management information 41, and stores in the USB storage 19A the job management information 41 from which the information on the selected print jobs has been deleted. After thus updating the job management information 41, the CPU 12 terminates the process shown in FIGS. 12A and 12B.

Figure 13:
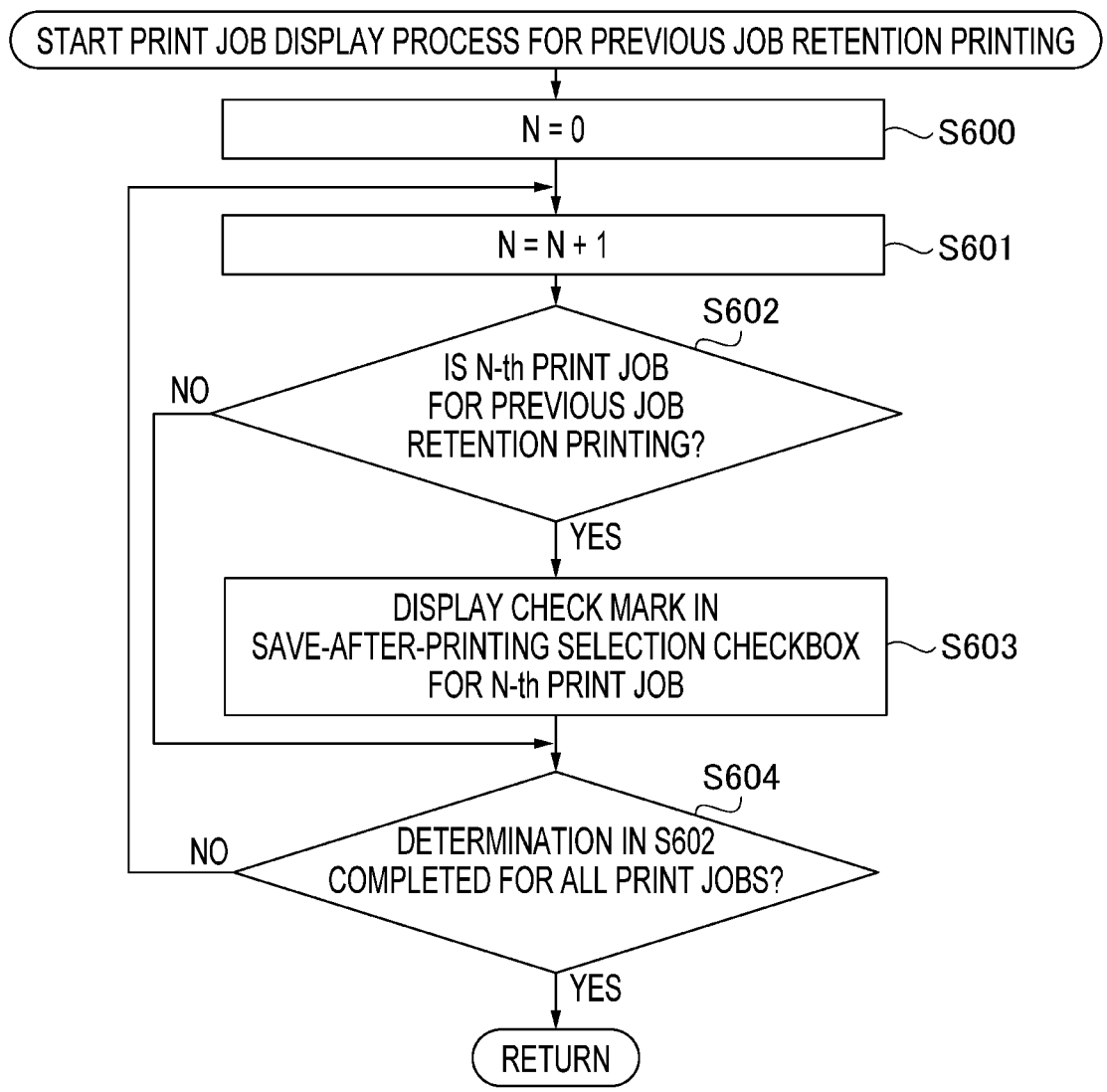
FIG. 13 is a flowchart showing a procedure of a print job display process for previous job retention printing included in the when-saved-in-storage process shown in FIGS. 12A and 12B.

After starting the process shown in FIG. 13, the CPU 12 resets a counter N to zero (i.e., N=0) in S600. This counter N is used to identify each of the print jobs displayed in the print job list in substantially the same manner as the counter N described above with reference to FIGS. 12A and 12B. However, the counter N mentioned here differs from the counter N described above with reference to FIGS. 12A and 12B in that the counter N described above with reference to FIGS. 12A and 12B is used to identify each of the print jobs further specified from among the print jobs displayed in the print job list, whereas the counter N mentioned here is used to identify each of all the print jobs displayed in the print job list.

Subsequently, in S601, the CPU 12 increments the counter N by "1." Then, in S602, the CPU 12 determines whether the N-th print job indicated by the counter N is a job for previous job retention printing. In the fourth illustrative embodiment, the CPU 12 makes the determination in S602 based on the flag for previous job retention printing included in the job management information 41 shown in FIGS. 14A and 14B. Namely, when the flag for previous job retention printing corresponding to the N-th print job is ON, the CPU 12 determines that the print job is a job for previous job retention printing. Meanwhile, when the flag for previous job retention printing corresponding to the N-th print job is OFF, the CPU 12 determines that the print job is not a job for previous job retention printing. FIG. 14A shows the job management information 41 in an initial state when each print job has been received. FIG. 14B shows the job management information 41 when the job retention printing has been specified one or more times for a print job 1 and a print job 3.

In response to determining in S602 that the N-th print job is a job for previous job retention printing (S602: Yes), the CPU 12 displays the check mark in the save-after-printing selection checkbox corresponding to the N-th print job in the print job list in S603. Then, the CPU 12 proceeds to S604. Meanwhile, in response to determining in S602 that the N-th print job is not a job for previous job retention printing (S602: No), the CPU 12 proceeds to S604.

In S604, the CPU 12 determines whether the determination in S602 has been completed for all the print jobs displayed in the print job list. In response to determining in S604 that one or more print jobs remain for which the determination in S602 is to be made (S604: No), the CPU 12 returns to S601. Meanwhile, in response to determining in S604 that no print job remains for which the determination in S602 is to be made (S604: Yes), the CPU 12 terminates the process shown in FIG. 13.

Thus, when the print job display process for previous job retention printing is performed, with respect to particular print jobs for which the previous job retention printing has been specified among the print jobs stored in the USB storage 19A, the check mark is displayed without a user designation operation in each of the corresponding checkboxes for the particular print jobs among the save-after-printing selection checkboxes 69A to 69E displayed in the print job list on the job selection screen 91E. Thereby, it is possible to save user's time and effort.

As described above, the MFP 1 of the fourth illustrative embodiment includes the reception I/F 34B configured to receive user input operations, the display 34A, the print engine 2 configured to print images on sheets, the USB storage 19A configured to store print jobs, and the CPU 12. The MFP 1 is enabled to select either the job retention printing or the job deletion printing. In the job retention printing, the MFP 1 causes the print engine 2 to print images based on print jobs on sheets, and thereafter retains the print jobs for which printing has been completed in the USB storage 19A. In the job deletion printing, the MFP 1 causes the print engine 2 to print images based on print jobs on sheets, and thereafter deletes the print jobs for which printing has been completed from the USB storage 19A.

On the display 34A, the save-after-printing selection checkboxes 69A to 69E are displayed, which are provided for the individual print jobs, respectively, and for selecting either the job retention printing or the job deletion printing. The CPU 12 performs a printing process according to input operations received via the reception I/F 34B. With respect to print jobs for which the job retention printing has been specified by the save-after-printing checkboxes 69A to 69E, the CPU 12 performs the printing process based on the print jobs and thereafter, in the retention/deletion process, retains the print jobs for which the printing process has been completed in the USB storage 19A. With respect to print jobs for which the job deletion printing has been specified by the save-after-printing checkboxes 69A to 69E, the CPU 12 performs the printing process based on the print jobs and thereafter, in the retention/deletion process, deletes the print jobs for which the printing process has been completed from the USB storage 19A.

Thus, in the MFP 1 of the fourth illustrative embodiment, each print job is provided with a corresponding one of the save-after-printing selection checkboxes 69A to 69E for selecting either the job retention printing or the job deletion printing. Thus, the MFP 1 is enabled to, prior to printing based on one or more print jobs as selected, select, for each selected print job, whether to store each selected print job after printing.

Fifth Illustrative Embodiment

Next, a fifth illustrative embodiment according to aspects of the present disclosure will be described. The fifth illustrative embodiment differs from the aforementioned first to fourth illustrative embodiments with respect to the configuration of the print jobs used for printing. Specifically, as shown in FIG. 2, each print job used in the first to fourth illustrative embodiments includes the user identification information and the image data. Meanwhile, each print job used in the fifth illustrative embodiment is different in that each print job further includes a job password. Hereinafter, a print job that includes a job password may be referred to as a "password-attached print job" to distinguish it from a print job that does not include a job password. The hardware elements described above with reference to FIGS. 1 and 2 shall be used as they are in the fifth illustrative embodiment.

Figure 15:
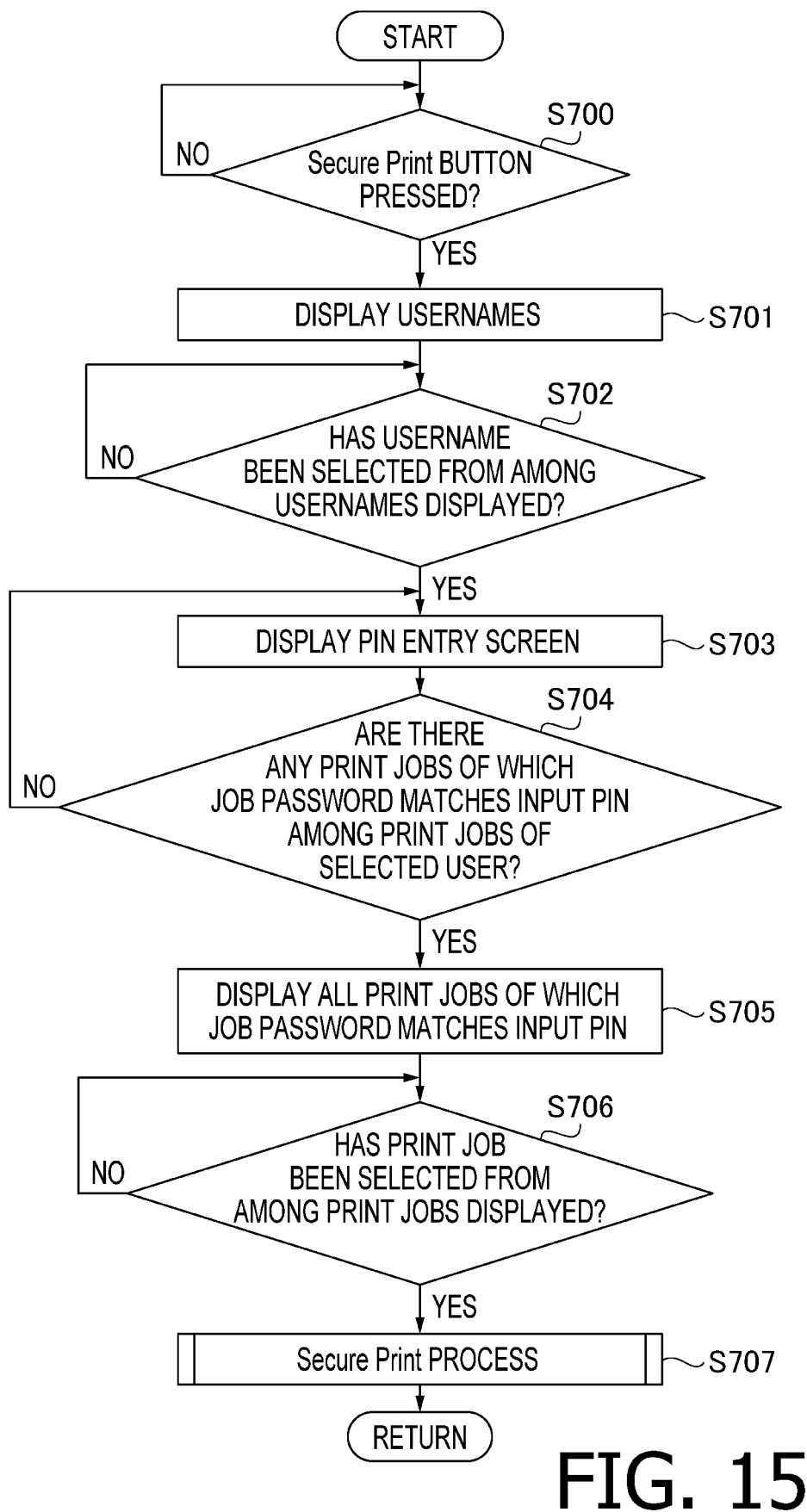
FIG. 15 is a flowchart showing a procedure of a process from selection of a password-attached print job until printing based on the selected password-attached print job.
Figure 17A:
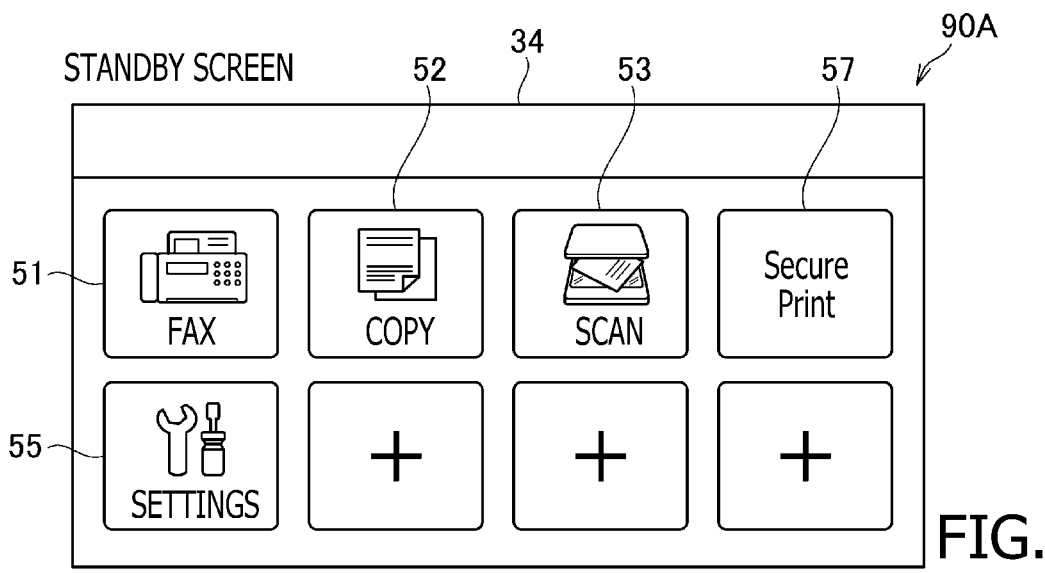
FIG. 17A shows an example of a standby screen.

FIG. 15 is a flowchart showing a procedure of a process, to be performed by the CPU 12 of the fifth illustrative embodiment, from selection of a password-attached print job until printing based on the selected password-attached print job. It is assumed that the password-attached print job is received, for instance, from the PC 18 and stored in the USB storage 19A before the process shown in FIG. 15 is started. Further, it is assumed that, for instance, a standby screen 90A shown in FIG. 17A is displayed on the display 34A before the process shown in FIG. 15 is started.

After starting the process shown in FIG. 15, in S700, the CPU 12 waits until a Secure Print button 57 on the standby screen 90A is pressed (S700: No). When the Secure Print button 57 has been pressed (S700: Yes), the CPU 12 proceeds to S701. In S701, the CPU 12 displays usernames on the display 34A. The job management information 41 in the USB storage 19A is updated when a password-attached print job is stored in the USB storage 19A, in substantially the same manner as in S205 of FIG. 3. Therefore, the CPU 12 is enabled to display the usernames of users who have sent password-attached print jobs stored in the USB storage 19A, based on the job management information 41.

In S702, the CPU 12 waits until the user selects one of the usernames displayed on the display 34A (S702: No). When the user has selected one of the usernames (S702: Yes), the CPU 12 displays a PIN entry screen on the display 34A in S703. In the fifth illustrative embodiment, the job password included in each password-attached print job is a PIN ("PIN" is an abbreviation for "Personal Identification Number"). However, the job password included in each password-attached print job may be a password in any other format.

When the user has input a PIN, the CPU 12 determines in S704 whether there are any print jobs of which the job password matches the input PIN among the print jobs of the selected user. In response to determining that there are no print jobs of which the job password matches the input PIN among the print jobs of the selected user (S704: No), the CPU 12 goes back to S703 and waits for a new PIN to be input. Meanwhile, in response to determining that there are one or more print jobs of which the job password matches the input PIN among the print jobs of the selected user (S704: Yes), the CPU 12 causes the display 34A to display all print jobs of which the job password matches the input PIN in S705.

Then, in S706, the CPU 12 waits until the user selects one of the print jobs displayed on the display 34A (S706: No). When the user has selected one of the jobs (S706: Yes), the CPU 12 performs a Secure Print process in S707.

Figure 16:
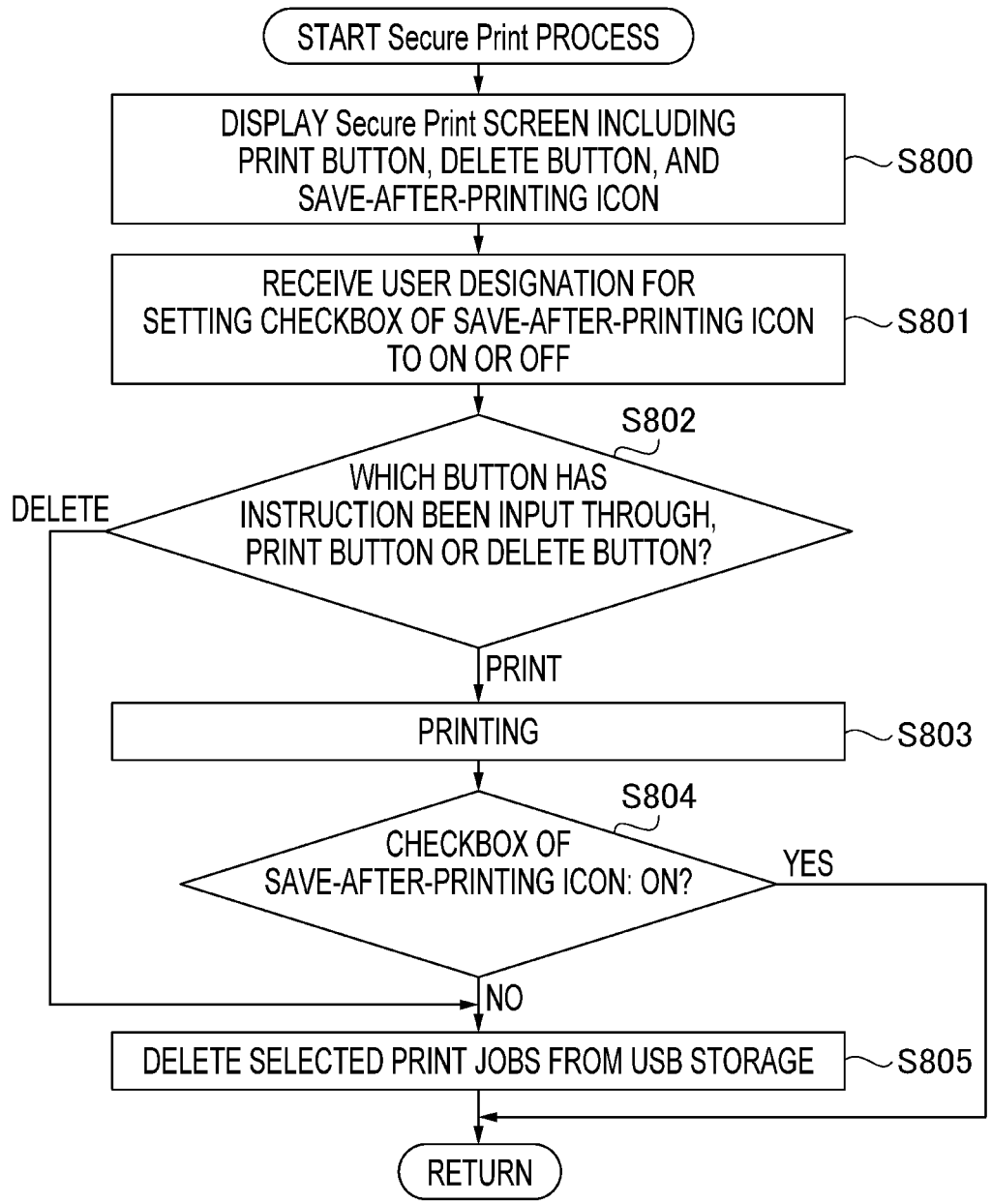
FIG. 16 is a flowchart showing a procedure of a Secure Print process included in the process shown in FIG. 15.
Figure 17B:
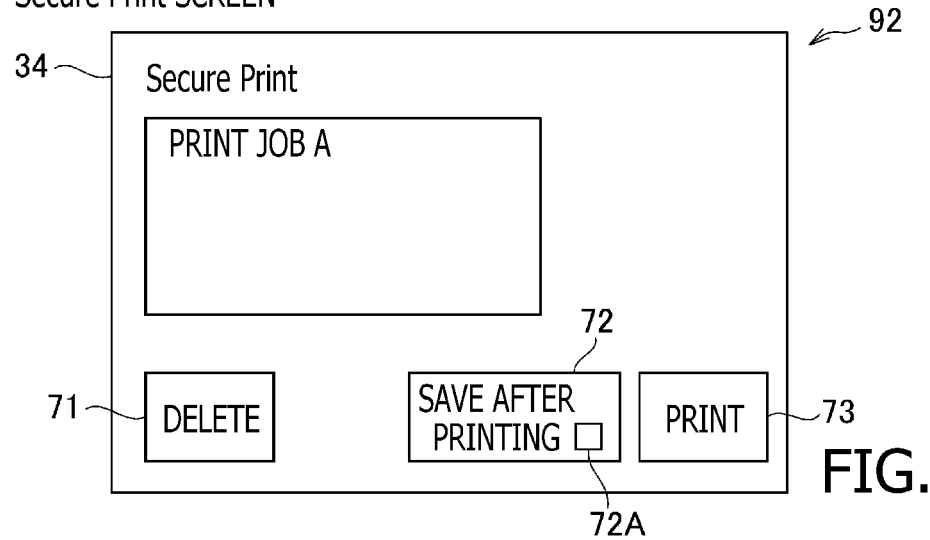
FIG. 17B shows an example of a Secure Print screen.

FIG. 16 is a flowchart showing a detailed procedure of the Secure Print process. After starting the process shown in FIG. 16, the CPU 12 displays a Secure Print screen that includes a print button, a delete button, and a save-after-printing icon on the display 34A of the touch panel 34 in S800. FIG. 17B shows an example of a Secure Print screen 92 displayed on the display 34A. The Secure Print screen 92 displays thereon a delete button 71, a print button 73, and a save-after-printing icon 72. In addition, a checkbox 72A is displayed in the save-after-printing icon 72. The print job(s) displayed in S705 are shown at an upper left side portion of the Secure Print screen 92.

After displaying the Secure Print screen 92, the CPU 12 receives user designation for the save-after-printing icon 72 in S801. The CPU 12 receives user selection of a print job to be deleted or printed via the reception I/F 34B of the touch panel 34 or the physical keys 35. The save-after-printing icon 72 is for selecting either the job retention printing or the job deletion printing. In the job retention printing, print jobs for which printing has been completed are retained in the USB storage 19A. In the job deletion printing, print jobs for which printing has been completed are deleted from the USB storage 19A. Each time the user touches the save-after-printing icon 72, the display state of the check mark in the checkbox 72A is repeatedly switched from one state to another between an ON state where the check mark is displayed and an OFF state where the check mark is not displayed. The ON state where the check mark is displayed in the checkbox 72A indicates that the job retention printing is selected. The OFF state where the check mark is not displayed in the checkbox 72A indicates that the job deletion printing is selected.

Subsequently, in S802, the CPU 12 determines whether an instruction has been input through the print button 73 or through the delete button 71. The print button 73 is configured to, when operated, provide an instruction to print images based on the image data 42 for the print job(s) selected by the user. The delete button 61 is configured to, when operated, provide an instruction to delete the print job(s) selected by the user. In response to determining that an instruction has been input through the print button 73 on the Secure Print screen 92 (S802: PRINT), the CPU 12 proceeds to S803.

In S803, the CPU 12 performs a printing process. The CPU 12 controls the print engine 2 to perform printing based on the image data 42 for the print jobs selected by the user on the Secure Print screen 92. When printing has been completed for all the print jobs selected on the Secure Print screen 92, the CPU 12 proceeds to S804.

In S804, the CPU 12 determines whether the job retention printing is specified by the save-after-printing icon 72. In response to determining that the job retention printing is specified by the save-after-printing icon 72 (S804: Yes), that is, when the check mark is displayed in the checkbox 72A, the CPU 12 terminates the process shown in FIG. 16. Meanwhile, in response to determining that the job deletion printing is specified by the save-after-printing icon 72 (S804: No), that is, when the check mark is not displayed in the checkbox 72A, the CPU 12 proceeds to S805.

In S805, the CPU 12 deletes the print jobs selected via the Secure Print screen 92 from the USB storage 19A. Then, CPU 12 terminates the process shown in FIG. 16.

In response to determining in S802 that an instruction has been input through the delete button 71 (S802: DELETE), the CPU 12 proceeds to S805.

As described above, the MFP 1 of the fifth illustrative embodiment includes the reception I/F 34B configured to receive user input operations, the display 34A, the print engine 2 configured to print images on sheets, the USB storage 19A configured to store print jobs, and the CPU 12. The MFP 1 is enabled to select either the job retention printing or the job deletion printing. In the job retention printing, the MFP 1 causes the print engine 2 to print images based on print jobs, and thereafter retains the print jobs for which printing has been completed in the USB storage 19A. In the job deletion printing, the MFP 1 causes the print engine 2 to print images based on print jobs, and thereafter deletes the print jobs for which printing has been completed from the USB storage 19A.

When each print job includes a PIN, and the CPU 12 has received an input operation to enter a PIN via the reception I/F 34B, the CPU 12 causes, in the display process, the display 34A to display print job(s) that include the PIN matching the accepted PIN from among the print jobs stored in the USB storage 19A. It is noted that each PIN may be an example of "authentication information" according to aspects of the present disclosure.

Thus, the MFP 1 of the fifth illustrative embodiment is configured to select either the job retention printing or the job deletion printing, prior to printing based on one or more print jobs as selected, in the Secure Print process as well. Therefore, the user is allowed to select whether to store the one or more print jobs after printing, prior to printing based on the one or more print jobs as selected, in the Secure Print process as well.

Sixth Illustrative Embodiment

Next, a sixth illustrative embodiment according to aspects of the present disclosure will be described. The sixth illustrative embodiment is the aforementioned fifth illustrative embodiment to which the function is added that is realized in the print job display process for previous job retention printing in the aforementioned fourth illustrative embodiment. Namely, the sixth illustrative embodiment differs from the fifth illustrative embodiment only in a part of the Secure Print process. Accordingly, the hardware elements described above with reference to FIGS. 1 and 2 shall be used as they are in the sixth illustrative embodiment.

Figure 18A:
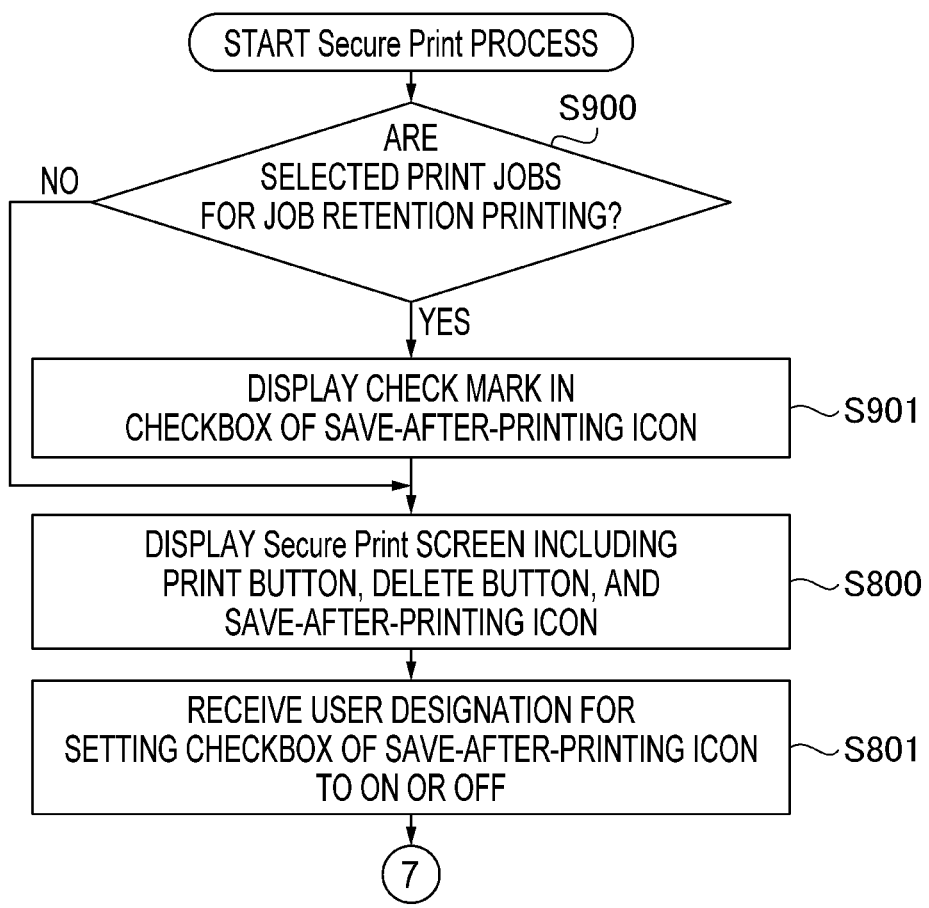
FIGS. 18A and 18B are flowcharts showing a procedure of a Secure Print process.
Figure 18B:
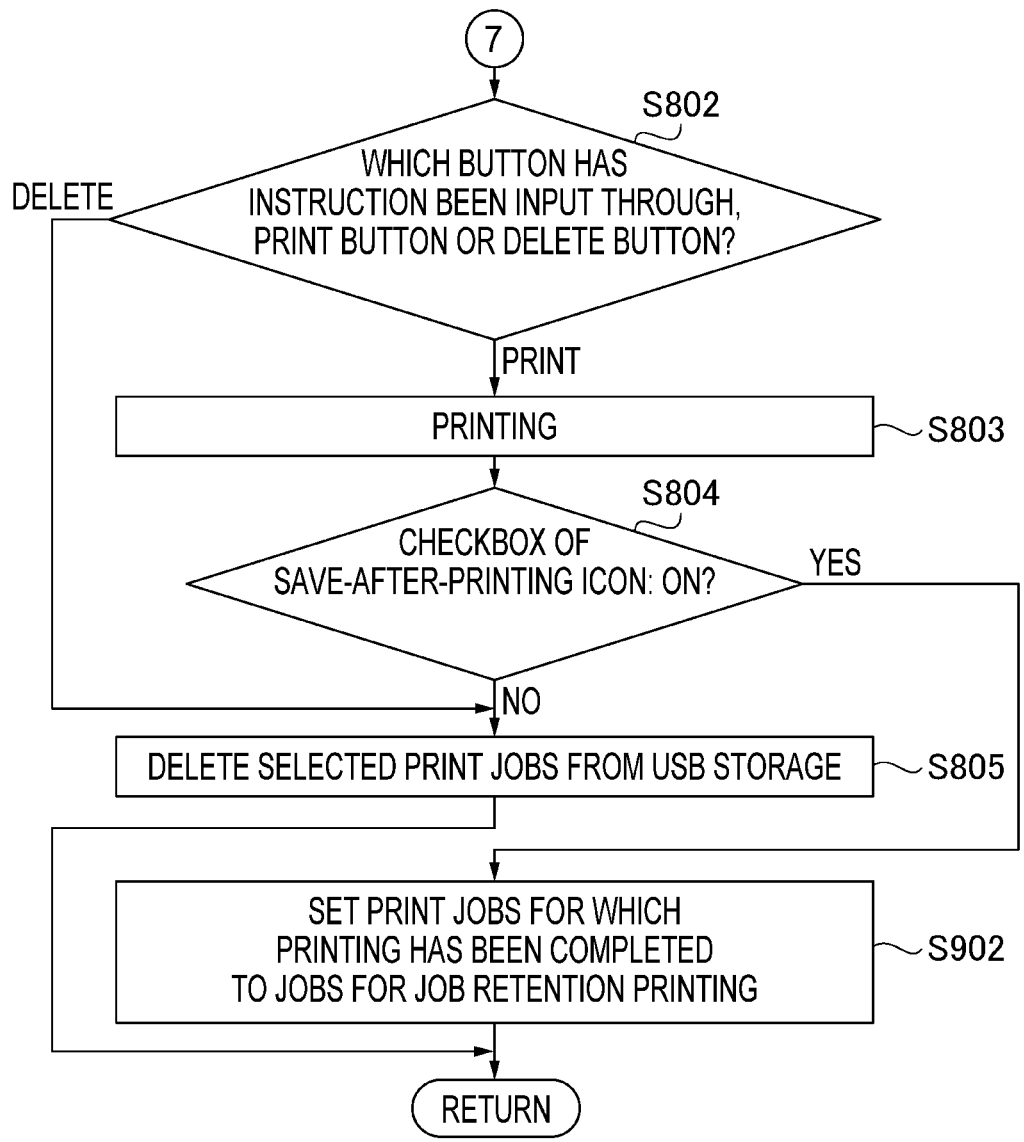

FIGS. 18A and 18B are flowcharts showing a procedure of a Secure Print process to be performed by the CPU 12 in the sixth illustrative embodiment. In FIGS. 18A and 18B, substantially the same processes (steps) as those in FIG. 16 are represented with the same reference characters, and detailed explanations thereof may be omitted. After starting the process shown in FIGS. 18A and 18B, the CPU 12 determines in S900 whether the selected print jobs are jobs for job retention printing. In the sixth illustrative embodiment, print jobs for job retention printing and print jobs for job deletion printing are distinguishable from one another. This distinguishability may be achieved by defining substantially the same flag as the flag for previous job retention printing described with reference to FIG. 14, e.g., a flag for job retention printing in the job management information 41. Thereby, the CPU 12 may make the determination in S900 based on whether the flag for job retention printing is ON or OFF.

In response to determining in S900 that the selected print jobs are jobs for job retention printing (S900: Yes), the CPU 12 proceeds to S901. Meanwhile, in response to determining that the selected print jobs are not jobs for job retention printing (S900: No), the CPU 12 proceeds to S800.

Figure 17C:
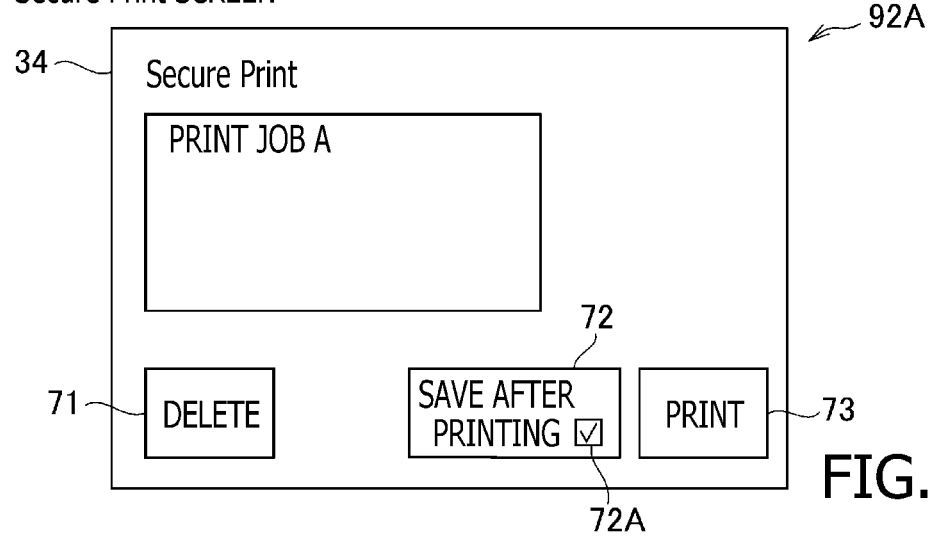
FIG. 17C shows another example of the Secure Print screen.

In S901, the CPU 12 displays the check mark in the checkbox 72A of the save-after-printing icon 72. Thereafter, the CPU 12 proceeds to S800. FIG. 17C shows an example of a Secure Print screen 92A when the check mark is displayed in the checkbox 72A of the save-after-printing icon 72.

Since a process of S800 to S805 in FIGS. 18A and 18B is substantially the same as a process of S800 to S805 in FIG. 16, a detailed explanation thereof may be omitted. However, in response to determining in S804 that the job retention printing is specified by the save-after-printing icon 72 (S804: Yes), that is, when the check mark is displayed in the checkbox 72A, the CPU 12 sets the print jobs for which printing has been completed to the jobs for job retention printing in S902. Namely, the flag for job retention printing corresponding to each print job for which printing has been completed is set to ON.

Thus, in the MFP 1 of the sixth illustrative embodiment, when the job retention printing is selected in the selection process with print jobs, containing authentication information matching the authentication information accepted in the selection process, being selected, the CPU 12 retains the print jobs for which the printing process has been completed in the USB storage 19A, and stores information indicating that those print jobs are print jobs for which the job retention printing has been selected in association with those print jobs in the USB storage 19A.

Thereby, the MFP 1 is enabled to store each print job in association with the information indicating whether each print job is a print job for which the job retention printing is selected, in the USB storage 19A.

When a print job selected in the selection process is associated with the information indicating that the print job is a print job for which the job retention printing has been selected, the CPU 12 sets, in the selection process, the save-after-printing icon 72 into the state where the job retention printing has been selected.

Thereby, for each print job for job retention printing among all the print jobs stored in the USB storage 19A, the check mark is displayed in the checkbox 72A of the save-after-printing icon 72 displayed on the Secure Print screen 92 without a user's specifying operation. This saves time and effort for the user.

Seventh Illustrative Embodiment

Figure 19:
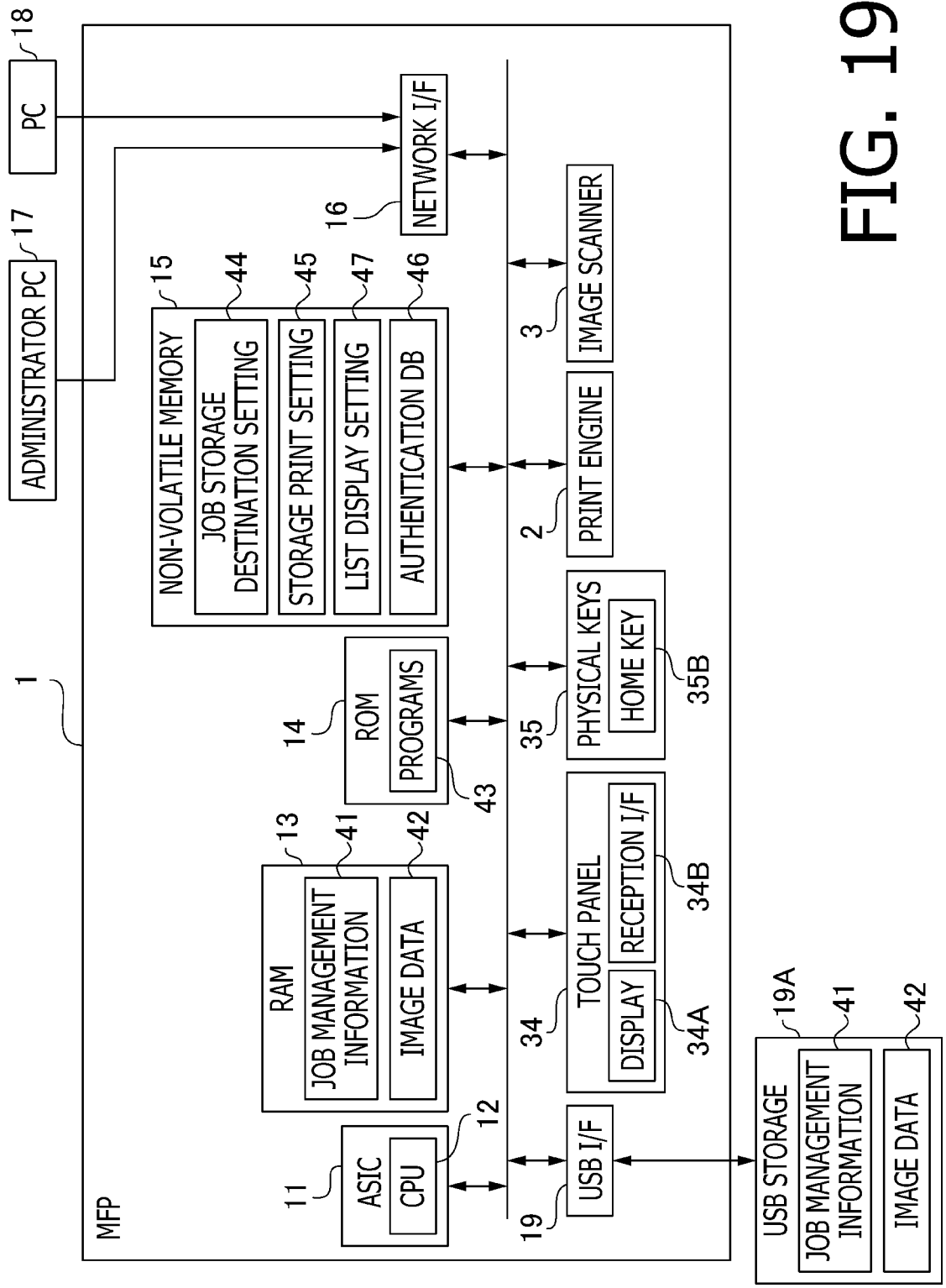
FIG. 19 is a block diagram showing an electrical configuration of an MFP.

A seventh illustrative embodiment according to aspects of the present disclosure will be described. FIG. 19 is a block diagram showing an electrical configuration of the MFP 1 in the seventh illustrative embodiment. The configuration shown in FIG. 19 is substantially the same as that in FIG. 2. However, the configuration shown in FIG. 19 differs from that in FIG. 2 in that the MFP 1 is communicably connected with an administrator PC 17 via the network I/F 16 on the LAN and that a list display setting 47 is stored in the non-volatile memory 15. The administrator PC 17 is an information terminal operable by the administrator of the MFP 1. The administrator PC 17 may be an example of an "external terminal" according to aspects of the present disclosure. The list display setting 47 will be described later.

Figure 20:
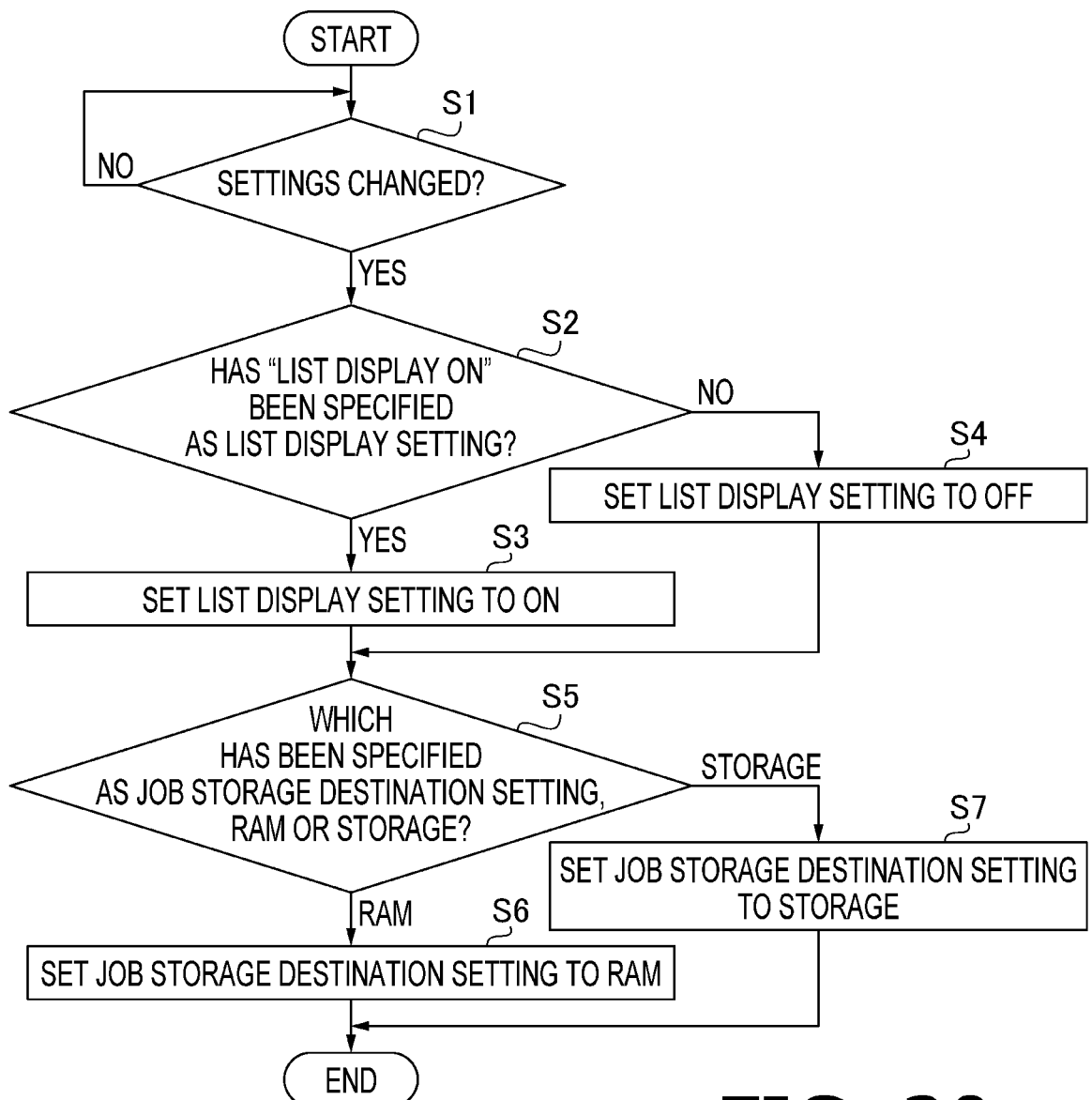
FIG. 20 is a flowchart showing a procedure of a setting change process for storage printing.

Next, referring to FIG. 20, an explanation will be provided of how the administrator changes settings for the MFP 1. In FIG. 20, an example case is described in which the administrator changes a list display setting and a job storage destination setting. The list display setting is for setting whether to display a job list display screen. The job list display screen will be described later with reference to FIG. 7B. The job storage destination setting is for setting a storage destination for the print job received from the PC 18 in the job storing process described with reference to FIG. 3.

The MFP 1 serves as a web server for EWS ("EWS" is an abbreviation for "Embedded Web Server") by the CPU 12 executing one or more programs 43 stored in the ROM 14. When the administrator of the MFP 1 launches a browser on the administrator PC 17 and inputs a particular URL for EWS in a URL entry field of the browser, a browser screen for configuring settings for the MFP 1 is displayed on a display of the administrator PC 17.

When the administrator has performed a particular operation on the browser screen and proceeded with a process of changing the settings (S1: Yes), a setting screen for the storage printing process (see FIG. 4) is displayed. When the administrator has performed an operation to specify "List Display ON" on the setting screen (S2: Yes), information on the operation as performed is sent to the MFP 1, and the list display setting 47 stored in the non-volatile memory 15 is set to ON (S3). Thereby, the CPU 12 of the MFP 1 is set to display the job list display screen in the storage printing process. When the administrator has performed an operation to specify "List Display OFF" on the setting screen (S2: No), information on the operation as performed is sent to the MFP 1, and the list display setting 47 stored in the non-volatile memory 15 is set to OFF (S4).

When the administrator has performed an operation to specify "RAM Storing" as the job storage destination setting on the setting screen (S5: RAM), information on the operation as performed is sent to the MFP 1, and the job storage destination setting 44 is set to "RAM" (S6). When the administrator has performed an operation to specify "STORAGE Storing" as the job storage destination setting on the setting screen (S5: STORAGE), information on the operation as performed is sent to the MFP 1, and the job storage destination setting 44 is set to "STORAGE" (S7).

Figure 21:
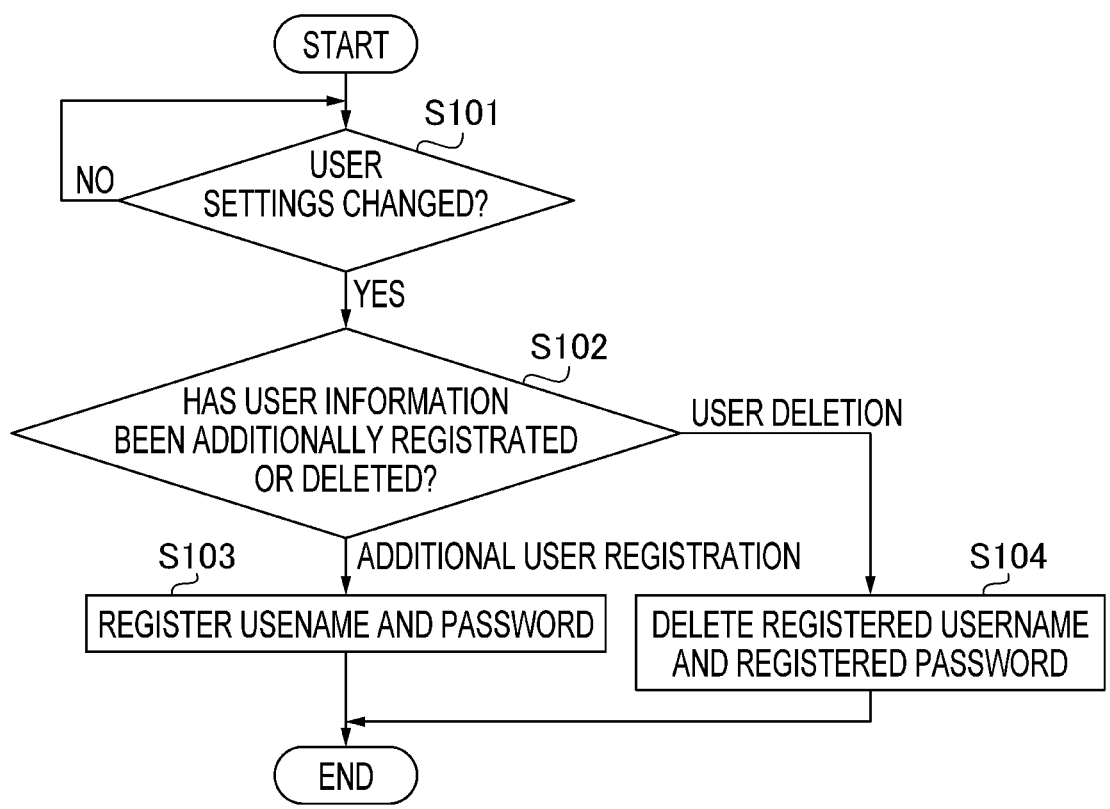
FIG. 21 is a flowchart showing a procedure of a setting change process for user settings.
Figure 22:
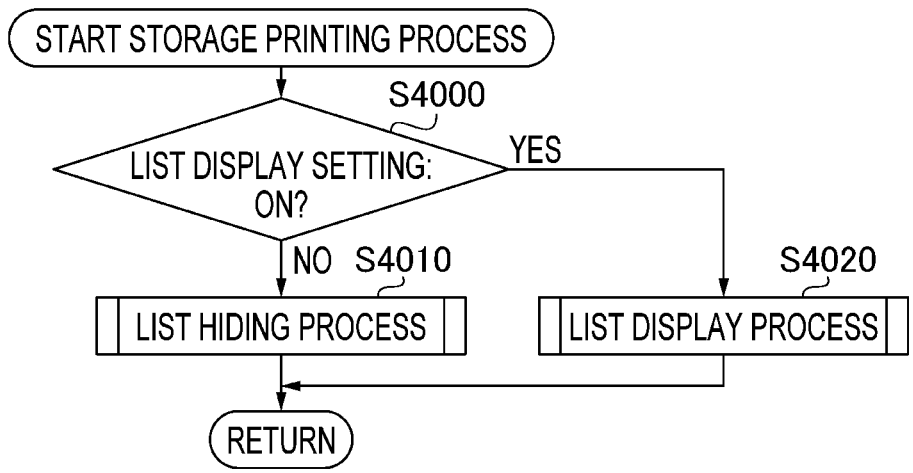
FIG. 22 is a flowchart showing a procedure of a storage printing process to store print jobs in the storage.

Next, referring to FIG. 21, an explanation will be provided of how the administrator changes settings for the authentication DB 46 stored in the non-volatile memory 15 of the MFP 1. When the administrator has changed the setting screen displayed on the display 34A from the setting screen for the storage printing process to a setting screen for user settings and changed the user settings (S101: Yes), if the setting change as made is registration of user information (S102: Additional User Registration), a username and a password as entered are sent to the MFP 1 and additionally registered in the authentication DB 46 stored in the non-volatile memory (S103). If the setting change as made is deletion of user information (S102: User Deletion), a username specified to be deleted is sent to the MFP 1, and the registered username and the registered password, corresponding to the specified username, are deleted from the authentication DB 46 stored in non-volatile memory 15 (S104).

The setting changes in FIGS. 20 and 21 are made from the administrator PC 17. However, the setting changes in FIGS. 20 and 21 may be made from the PC 18 or from the operation panel 33 or the touch panel 34 of the MFP 1.

The CPU 12 of the MFP 1 performs the aforementioned job storing process to store a print job in the storage including the USB storage 19A and the RAM 13 in accordance with the procedure shown in FIG. 3 Since the respective processes in S200 to S205 of FIG. 3 have been described above, detailed explanations thereof are omitted.

Next, a flow of the storage printing process will be explained with reference to FIGS. 4, 22 to 24, 7A and 7B. In response to a user who has sent a print job from the PC 18 to the MFP 1 operating the home key 35B of the MFP 1, the standby screen 90 as shown in FIG. 7A is displayed on the display 34A of the touch panel 34. The standby screen 90 includes a fax button 51, a copy button 52, a scan button 53, a storage printing button 54, a settings button 55, and a user authentication button 56.

The user authentication button 56 is used when a user logs in to or logs out from the MFP 1. When the user authentication button 56 is pressed, the CPU 12 starts the process shown in FIG. 4. In S300 of FIG. 4, the CPU 12 performs an authentication process. The CPU 12 displays a login screen on the display 34A of the touch panel 34 and accepts user identification information and a password input through the physical keys 35. In response to the user identification information and the password being input by the user, the CPU 12 checks the user identification information and the password as input by the user against information stored in advance in an authentication DB 46 stored in the non-volatile memory 15. When the information (i.e., the user identification information and the password) input by the user matches the information stored in advance in the authentication DB 46, the user is allowed to log in to the MFP 1. In response to the user logging in to the MFP 1 (S301: Yes), the CPU 12 proceeds to S302.

In S302, the CPU 12 determines whether there are any print jobs of the logged-in user that are stored in the RAM 13 or in the USB storage 19A. The CPU 12 searches for the print job associated with the user identification information of the logged-in user from among print jobs stored in the job management information 41 in the RAM 13 or the USB storage 19A. When one or more print jobs associated with the user identification information of the logged-in user have been found as a result of the search (S302: Yes), the CPU 12 proceeds to S303. In S303, the CPU 12 performs the storage printing process. The storage printing process will be described later with reference to FIG. 22.

When there are no print jobs associated with the user identification information of the logged-in user in the job management information 41 (S302: No), or after completion of S303, the CPU 12 proceeds to S304. In S304, the CPU 12 displays the standby screen 90 on the display 34A of the touch panel 34. Then, the CPU 12 proceeds to S305.

In S305, the CPU 12 determines whether the storage printing button 54 has been pressed. In response to determining that the storage printing button 54 has been pressed (S305: Yes), the CPU 12 goes back to S302. Meanwhile, in response to determining that the storage printing button 54 has not been pressed (S305: No), the CPU 12 proceeds to S306.

In S306, the CPU 12 determines whether the logged-in user has logged out. When the user has performed a particular operation to log out from the MFP 1 (S306: Yes), the CPU 12 terminates the process shown in FIG. 4. Meanwhile, when the user has not performed a particular operation to log out from the MFP 1 (S306: No), the CPU 12 returns to S305.

The storage printing process to be performed in S303 of FIG. 4 will be described with reference to FIGS. 22 to 24, 7A and 7B. After starting the process shown in FIG. 22, the CPU 12 determines in S4000 whether the list display setting 47 stored in the non-volatile memory 15 is ON. In response to determining that the list display setting 47 stored in the non-volatile memory 15 is OFF (S4000: No), the CPU 12 performs a list hiding process in S4010. The list hiding process will be described later with reference to FIG. 24. After completion of the list hiding process in S4010, the CPU 12 terminates the process shown in FIG. 22. Meanwhile, in response to determining that the list display setting 47 stored in the non-volatile memory 15 is ON (S4000: Yes), the CPU 12 performs a list displaying processing in S4020. The list displaying process will be described next with reference to FIGS. 23A and 23B. After completion of the list displaying process in S4020, the CPU 12 terminates the process shown in FIG. 22.

Figure 23A:
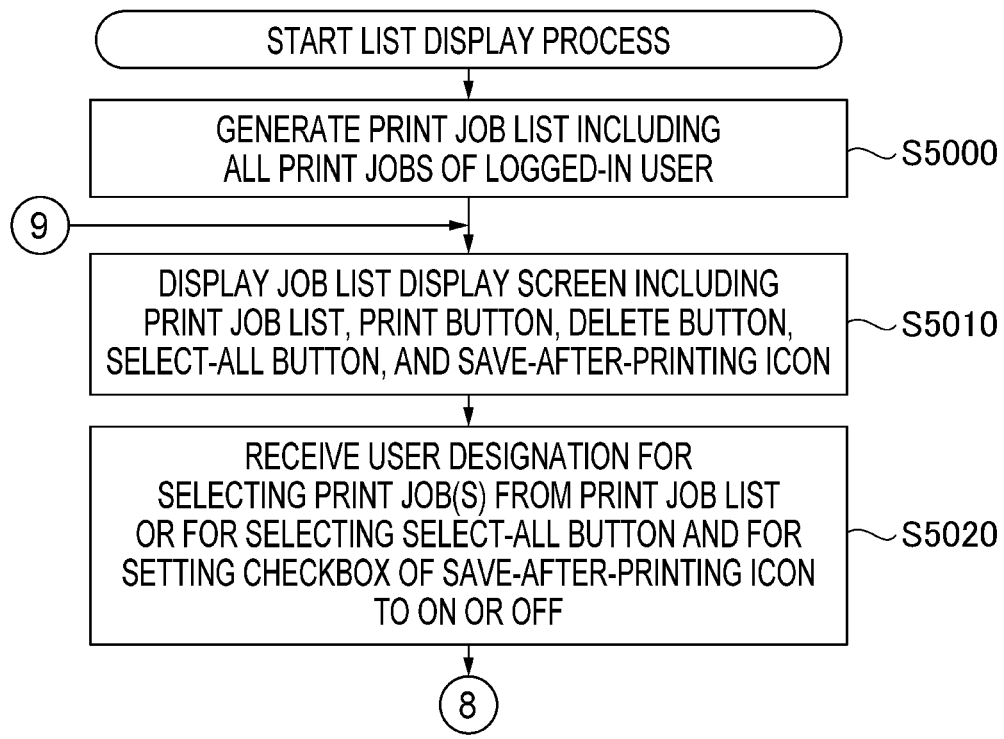
FIGS. 23A and 23B are flowcharts showing a procedure of a list display process included in the storage printing process shown in FIG. 22.
Figure 23B:
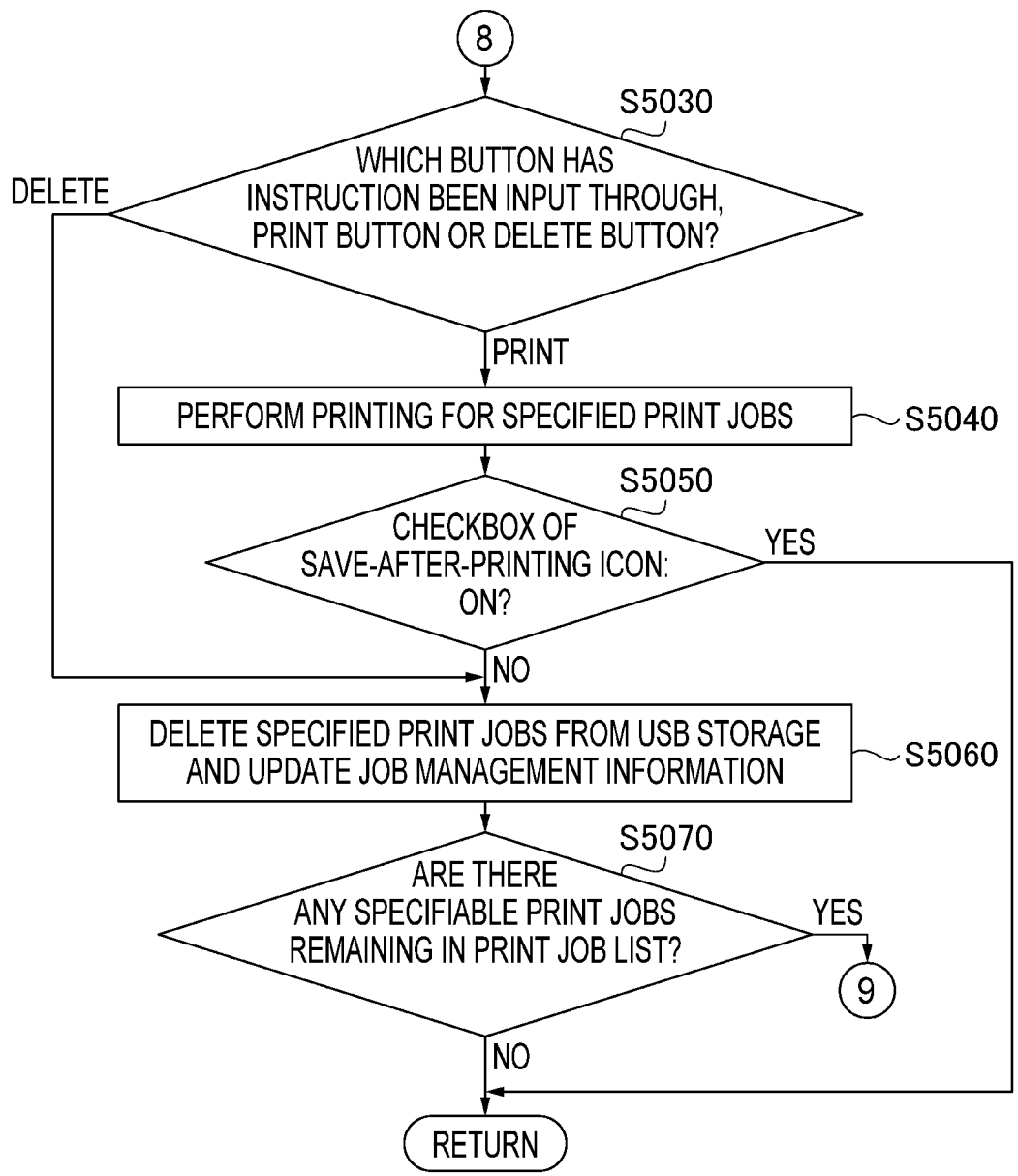

After starting the process shown in FIGS. 23A and 23B, in S5000, the CPU 12 obtains information about print jobs of the logged-in user from the job management information 41, searches for all the print jobs of the logged-in user from the USB storage 19A, and generates a print job list that includes all of the print jobs found through the search. After generating the print job list, the CPU 12 proceeds to S5010.

In S5010, the CPU 12 displays a job list display screen on the display 34A of the touch panel 34. The job list display screen includes the print job list, a print button, a delete button, a select-all button, and a save-after-printing icon. FIG. 7B shows an example of a job list display screen 91 displayed on the display 34A. It is noted that in the aforementioned first illustrative embodiment, the screen 91 displayed on the display 34A is referred to as the "job selection screen." However, in the seventh illustrative embodiment, the screen 91 displayed on the display 34A is referred to as the "job list display screen." The job list display screen 91 displays thereon the delete button 61, the select-all button 62, the print button 63, the save-after-printing icon 68, the checkboxes 66A to 66E, and the scroll buttons 64 and 65. Further, the checkbox 68A is displayed on the save-after-printing icon 68. At a left side portion of the job list display screen 91, the print job list generated in S5000 is displayed.

When the job list display screen 91 is displayed, the CPU 12 receives, in 55020, user designation for selecting print job(s) from the print job list or for selecting the select-all button 62 and for setting the save-after-printing icon 68. The CPU 12 receives the user's selection of print job(s) that the user wishes to delete or print via the reception I/F 34B of the touch panel 34 or the physical keys 35. When the user has selected and pressed print job(s) that the user wishes to delete or print from among the print jobs included in the print job list displayed on the job list display screen 91, a check mark is displayed in a corresponding one of the checkboxes 66A to 66E that is located on the left side of each selected print job. When the user has pressed the select-all button 62, the check mark is displayed in each of the checkboxes 66A to 66E of all the print jobs displayed on the job list display screen 91. When the user has pressed the delete button 61 or the print button 63, the selection of the print job(s) is confirmed. The save-after-printing icon 68 is an icon for the user to select either the job retention printing function or the job deletion printing function. The job retention printing function is a function to store, in the USB storage 19A, print jobs for which printing has been completed. The job deletion printing function is a function to delete, from the USB storage 19A, print jobs for which printing has been completed. Each time the user specifies the save-after-printing icon 68, the display state of the check mark in the checkbox 68A is repeatedly switched from one state to another between the ON state where the check mark is displayed and the OFF state where the check mark is not displayed. The ON state where the check mark is displayed in the checkbox 68A indicates that the job retention printing is selected. The OFF state where the check mark is not displayed in the checkbox 68A indicates that the job deletion printing is selected.

Subsequently, in S5030, the CPU 12 determines whether an instruction has been input through the print button 63 or through the delete button 61. The print button 63 is configured to, when operated, provide an instruction to print images based on the image data 42 for the print job(s) selected by the user. The delete button 61 is configured to, when operated, provide an instruction to delete the print job(s). In response to receiving an instruction input through the print button 63 on the job list display screen 91 (S5030: PRINT), the CPU 12 proceeds to S5040.

In S5040, the CPU 12 performs a printing process. The CPU 12 controls the print engine 2 to print images based on the image data 42 for the print jobs specified by the user on the job list display screen 91. When printing has been completed for all the print jobs specified on the job list display screen 91, the CPU 12 proceeds to S5050.

In S5050, the CPU 12 determines whether the checkbox 68A of the save-after-printing icon 68 is set to ON, i.e., whether the save-after-printing icon 68 is set to specify the job retention printing. In response to determining in S5050 that the save-after-printing icon 68 is set to specify the job retention printing (S5050: Yes), i.e., when the check mark is displayed in the checkbox 68A, the CPU 12 terminates the process shown in FIGS. 23A and 23B. Thereby, the specified print jobs remain stored in the USB storage 19A even after printing.

On the other hand, in response to determining in S5050 that the save-after-printing icon 68 is set to specify the job deletion printing (S5050: No), i.e., when the check mark is not displayed in the checkbox 68A, the CPU 12 proceeds to S5060.

In S5060, the CPU 12 deletes the print jobs specified on the job list display screen 91 from the USB storage 19A, and deletes information on the specified print jobs from the print job list generated in S5000, thereby updating the print job list. At this time, the CPU 12 performs an updating process to update the job management information 41, by deleting the information on the specified print jobs from the job management information 41 and storing in the USB storage 19A the job management information 41 from which the information on the specified print jobs has been deleted. Thereby, the specified print jobs are deleted from the USB storage 19A after printing. After updating the job management information 41, the CPU 12 proceeds to S5070.

In S5070, the CPU 12 determines whether there are any specifiable print jobs remaining in the print job list. In response to determining that one or more specifiable print jobs remain in the print job list (S5070: Yes), the CPU 12 returns to S5010. Meanwhile, in response to determining that there are no specifiable print jobs remaining in the print job list (S5070: No), the CPU 12 terminates the process shown in FIGS. 23A and 23B.

In response to receiving an instruction input through the delete button 61 on the job list display screen 91 (S5030: DELETE), the CPU 12 proceeds to S506. Thereby, all the print jobs specified on the job list display screen 91 are deleted from the USB storage 19A without printing performed therefor.

The list display process shown in FIGS. 23A and 23B has the print jobs stored in the USB storage 19A as processing targets thereof. However, the print jobs may be stored in the RAM 13 as described above with reference to FIG. 3. Thus, the list display process may have the print jobs stored in the RAM 13 as processing targets thereof. In this case, however, it is preferable not to display the save-after-printing icon 68 on the job list display screen 91. The reason for this is to prevent the job retention printing function from being selected via the save-after-printing icon 68. Specifically, if the job retention printing is specified for the print jobs stored in the RAM 13, it will cause a problem that is difficult to handle when the print jobs stored in the RAM 13 are deleted, for instance, due to the MFP 1 being turned off. Therefore, to perform a printing process for the print jobs stored in the RAM 13, it is preferable to prevent the job retention printing from being selected from the beginning by not displaying the save-after-printing icon 68.

Figure 24:
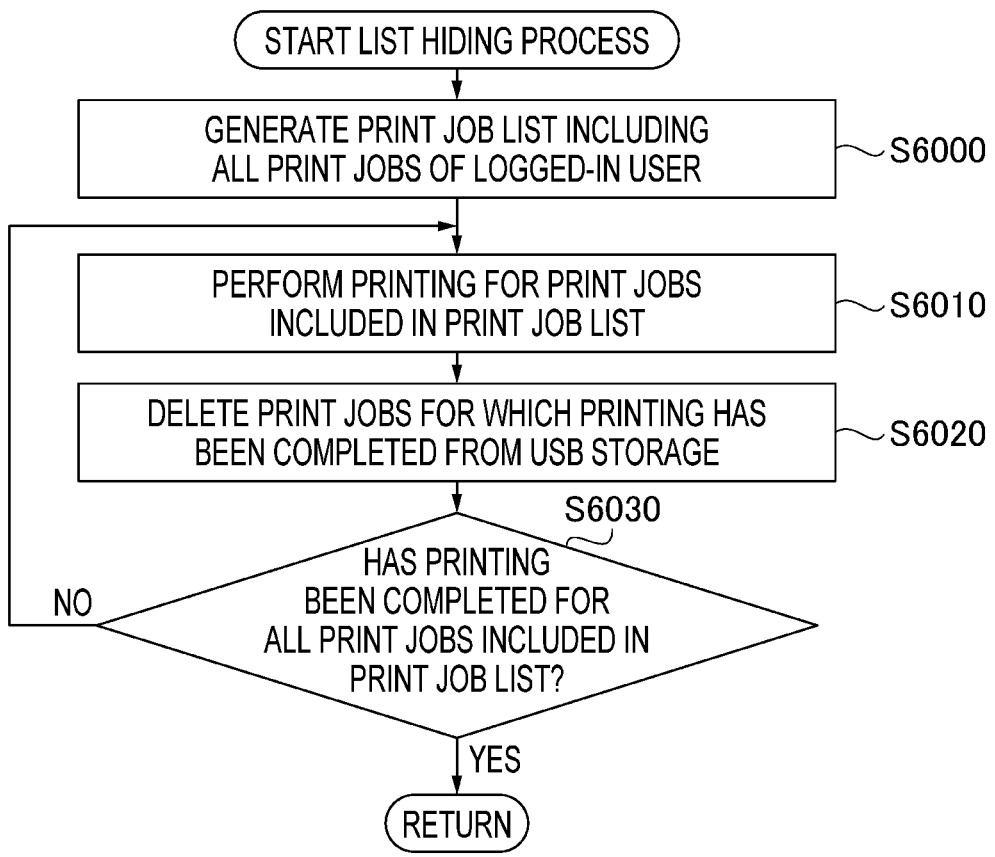
FIG. 24 is a flowchart showing a procedure of a list hiding process included in the storage printing process shown in FIG. 22.

After starting the process shown in FIG. 24, in S6000, the CPU 12 obtains information about print jobs of the logged-in user from the job management information 41 and generates a print job list that includes all the print jobs of the logged-in user, in substantially the same manner as in S5000. After generating the print job list, the CPU 12 proceeds to S6010.

In S6010, the CPU 12 performs a printing process. The CPU 12 controls the print engine 2 to perform printing based on the image data 42 for the print jobs included in the print job list generated in S6000.

Subsequently, in S6020, the CPU 12 deletes the print jobs for which the printing process has been completed from the USB storage 19A.

Then, the CPU 12 continues to execute S6010 and S6020 until printing is completed for all the print jobs included in the print job list (S6030: No). When printing has been completed for all the print jobs included in the print job list (S6030: Yes), the CPU 12 terminates the process shown in FIG. 24.

As described above, the MFP 1 of the seventh illustrative embodiment includes the reception I/F 34B, the USB storage 19A, the display 34A, the print engine 2, and the CPU 12. The reception I/F 34B is configured to receive user input operations. The USB storage 19A is configured to store print jobs and user identification information about users who have stored the print jobs in the USB storage 19A, in association with each other. The display 34A is configured to display one or more print jobs stored in the USB storage 19A prior to printing. The print engine 2 is configured to print images on sheets. The MFP 1 is enabled to select either the job retention printing or the job deletion printing. In the job retention printing, the MFP 1 causes the print engine 2 to print images based on print jobs on sheets, and thereafter retains the print jobs for which printing has been completed in the USB storage 19A. In the job deletion printing, the MFP 1 causes the print engine 2 to print images based on print jobs on sheets, and thereafter deletes the print jobs for which printing has been completed from the USB storage 19A.

Then, the CPU 12 is configured to perform an authentication process to receive an input operation to log in to the MFP 1 via the reception I/F 34B and perform user authentication based on user identification information entered by the input operation. The CPU 12 is further configured to perform a first printing process after the authentication process. In the first printing process, when the list display setting 47 for the display 34A is OFF, the CPU 12 causes the print engine 2 to print, on sheets, images based on print jobs that are stored in the USB storage 19A in association with the user identification information, and thereafter deletes the print jobs from the USB storage 19A. The CPU 12 is further configured to perform a second printing process after the authentication process. In the second printing process, when the list display setting 47 for the display 34A is ON, the CPU 12 causes the display 34A to display the print jobs that are stored in the USB storage 19A in association with the user identification information, selects one or more print jobs from among the print jobs displayed on the display 34A in accordance with input operations received via the reception I/F 34B, and causes the print engine 2 to print, on sheets, images based on the selected one or more print jobs.

Further, in the second printing process, when causing the display 34A to display the print jobs, the CPU 12 causes the display 34A to display a selection operator for selecting either the job retention printing or the job deletion printing. When the job retention printing is selected by the save-after-printing icon 68, the CPU 12 retains the one or more print jobs in the USB storage 19A after printing. When the job deletion printing is selected by the save-after-printing icon 68, the CPU 12 deletes the one or more print jobs from the USB storage 19A after printing.

Thus, in the MFP 1 of the seventh illustrative embodiment, after the authentication process, when the list display setting 47 is OFF, the print jobs that are stored in the USB storage 19A in association with the user identification information are deleted from the USB storage 19A after printing. On the other hand, after the authentication process, when the list display setting 47 is ON, it is possible to select whether to retain the one or more print jobs, selected from among the print jobs that are stored in the USB storage 19A in association with the user identification information, in the USB storage 19A after printing. Thus, according to the MFP 1 in the seventh illustrative embodiment, it is possible to select whether to retain the print jobs, associated with user identification information matching the entered user identification information, in the USB storage 19A even after printing, depending on whether the list display setting 47 is ON or OFF.

In the seventh illustrative embodiment, the MFP 1 may be an example of the "printing apparatus" according to aspects of the present disclosure. The USB storage 19A may be an example of the "storage" according to aspects of the present disclosure. The CPU 12 may be an example of the "controller" according to aspects of the present disclosure. The save-after-printing icon 68 may be an example of the "operable selection object" according to aspects of the present disclosure. The list display setting 47 may be an example of a "display setting" according to aspects of the present disclosure.

The save-after-printing icon 68 is a selection icon for selecting either the job retention printing or the job deletion printing. The CPU 12 causes the display 34A to display the print jobs and the save-after-printing icon 68 in the second printing process. When the job retention printing is selected by the save-after-printing icon 68, the CPU 12 causes the print engine 2 to perform printing according to input operations received via the reception I/F 34B, and thereafter retains the print jobs for which printing has been completed in the USB storage 19A. When the job deletion printing is selected by the save-after-printing icon 68, the CPU 12 causes the print engine 2 to perform printing according to input operations received via the reception I/F 34B, and thereafter deletes the print jobs for which printing has been completed from the USB storage 19A.

Thereby, in the MFP 1 of the seventh illustrative embodiment, it is possible to select whether to retain the print jobs, associated with the user authentication information matching the entered user authentication, in USB storage 19A even after printing, depending on whether the list display setting 47 is ON or OFF.

The display 34A is included in the touch panel 34 having the reception I/F 34B. The save-after-printing icon 68 is a selection icon for selecting either the job retention printing or the job deletion printing. In the second printing process, the CPU 12 causes the display 34A to display the print jobs, the save-after-printing icon 68, and the print button 63 for providing a print instruction. When the job retention printing is selected by the save-after-printing icon 68, in response to the print button 63 being operated according to an input operation received via the reception I/F 34B, the CPU 12 causes the print engine 2 to perform printing, and thereafter retains the print jobs for which printing has been completed in the USB storage 19A. When the job deletion printing is selected by the save-after-printing icon 68, in response to the print button 63 being operated according to an input operation received via the reception I/F 34B, the CPU 12 causes the print engine 2 to perform printing, and thereafter deletes the print jobs for which printing has been completed from the USB storage 19A.

Thereby, the user is allowed to select, after the authentication process and when the list display setting 47 is ON, whether to retain one or more print jobs, selected from among the print jobs that are stored in the USB storage 19A in association with the user identification information, in the USB storage 19A after printing, before operating the print button 63.

The CPU 12 is further configured to perform a first switching process to switch the list display setting 47 to ON or OFF according to an input operation received via the reception I/F 34B. In the second printing process, when the list display setting 47 is ON, the CPU 12 displays the print job list on the display 34A.

Thus, the MFP 1 is enabled to switch the list display setting 47 to ON or OFF as requested.

Further, the MFP 1 includes the network I/F 16 configured to communicate with an external terminal. The CPU 12 is further configured to perform a second switching process to switch the list display setting 47 to ON or OFF according to an instruction received via the network I/F 16. In the second printing process, when the list display setting 47 is ON, the CPU 12 displays the print job list on the display 34A. The network I/F 16 may be an example of the "communication interface" according to aspects of the present disclosure.

Thus, the MFP 1 is enabled to switch the list display setting 47 to ON or OFF as requested from the administrator PC 17 connected with the network I/F 16.

The storage includes the USB storage 19A and the RAM 13. The CPU 12 displays the save-after-printing icon 68 on the display 34A when the print jobs are stored in the USB storage 19A. Meanwhile, the CPU 12 does not display the save-after-printing icon 68 on the display 34A when the print jobs are stored in the RAM 13. The USB storage 19A may be an example of a "non-volatile memory" according to aspects of the present disclosure. The RAM 13 may be an example of a "volatile memory" according to aspects of the present disclosure.

Thus, the MFP 1 is unable to specify the job retention printing for the print jobs stored in the RAM 13. Therefore, it is possible to prevent in advance malfunctions in a case where the print jobs for which the job retention printing is specified are deleted.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents.

In each of the aforementioned illustrative embodiments, the MFP 1 has been described as an example of a "printing apparatus" according to aspects of the present disclosure. However, examples of the "printing apparatus" are not limited to the MFP 1 but may include stand-alone printers.

In each of the aforementioned illustrative embodiments, a single CPU 12 is used as an example of a "controller" according to aspects of the present disclosure. However, for instance, the "controller" according to aspects of the present disclosure may include a plurality of CPUs. In another instance, the "controller" according to aspects of the present disclosure may include a multi-core processor.

The following shows examples of associations between elements illustrated in the aforementioned illustrative embodiment(s) and modification(s), and elements claimed according to aspects of the present disclosure. For instance, the MFP 1 may be an example of a "printing apparatus" according to aspects of the present disclosure. The reception I/F 34B and the physical keys 35B may be included in examples of a "reception interface" according to aspects of the present disclosure. The display 34A may be an example of a "display" according to aspects of the present disclosure. The print engine 2 may be an example of a "print engine" according to aspects of the present disclosure. The USB storage 19A may be an example of a "storage" according to aspects of the present disclosure. The USB storage 19A may be an example of a "non-volatile memory" of the "storage" according to aspects of the present disclosure. The RAM 13 may be an example of a "volatile memory" of the "storage" according to aspects of the present disclosure. The CPU 12 may be an example of a "controller" according to aspects of the present disclosure. The CPU 12 may be an example of a "processor" according to aspects of the present disclosure. The ROM 14 storing the programs 43 may be an example of a "non-transitory computer-readable storage medium" storing "computer-readable instructions" according to aspects of the present disclosure. The network I/F 16 may be an example of a "communication interface" according to aspects of the present disclosure. The administrator PC 17 and the PC 18 may be included in examples of an "external terminal" according to aspects of the present disclosure. The save-after-printing icon 68 16 may be an example of an "operable selection object" according to aspects of the present disclosure. The list display setting 47 may be an example of a "display setting" according to aspects of the present disclosure. The touch panel 34 may be an example of a "touch panel" according to aspects of the present disclosure.

What is claimed is:

1. A printing apparatus comprising:
a touch panel having a reception interface; and
a display;
a print engine;
a storage; and
a controller configured to:
cause the display to display thereon a job selection screen, the job selection screen concurrently displaying a list of print jobs stored in the storage, and a single checkbox configured to select any one of job retention printing and job deletion printing;
in response to input operations received via the reception interface, select one or more print jobs from among the print jobs displayed on the display, and set the single checkbox to select one of the job retention printing and the job deletion printing;
cause the print engine to perform a printing process to print images based on the selected one or more print jobs on sheets;
determine whether to retain or delete the selected one or more print jobs after the printing process, based on which of the job retention printing and the job deletion printing is selected by the single checkbox, wherein the one or more print jobs for which the printing process has been completed are retained in the storage after the printing process, when the job retention printing is selected, whereas the one or more print jobs for which the printing process has been completed are deleted from the storage after the printing process, when the job deletion printing is selected;
display a job retention printing button on the job selection screen using wording of job retention printing displayed on a printing button when the job retention printing is selected by enabling the single checkbox, whereas displaying a job deletion printing button on the job selection screen using different wording of job deletion printing displayed on the printing button when the job deletion printing is selected by not enabling the single checkbox;
in response to the job retention printing button on the job selection screen being operated via the reception interface, cause the print engine to perform the printing process, and thereafter retain in the storage the one or more print jobs for which the printing process has been completed; and
in response to the job deletion printing button on the job selection screen being operated via the reception interface, cause the print engine to perform the printing process, and thereafter delete from the storage the one or more print jobs for which the printing process has been completed.

2. The printing apparatus according to claim 1, wherein the controller is further configured to:
in response to receiving a print instruction via the reception interface when the job retention printing is selected by the single checkbox, cause the print engine to perform the printing process, and thereafter retain in the storage the one or more print jobs for which the printing process has been completed; and
in response to receiving a print instruction via the reception interface when the job deletion printing is selected by the single checkbox, cause the print engine to perform the printing process, and thereafter delete from the storage the one or more print jobs for which the printing process has been completed.

3. The printing apparatus according to claim 2, wherein the controller is further configured to:
display a print button on the display;
in response to the print button being operated via the reception interface when the job retention printing is selected by the single checkbox, cause the print engine to perform the printing process, and thereafter retain in the storage the one or more print jobs for which the printing process has been completed; and in response to the print button being operated via the reception interface when the job deletion printing is selected by the single checkbox, cause the print engine to perform the printing process, and thereafter delete from the storage the one or more print jobs for which the printing process has been completed.

4. The printing apparatus according to claim 1, wherein the controller is further configured to:

display, as the single checkbox, a job retention printing button and a job deletion printing button on the display;

in response to the job retention printing button being operated via the reception interface, cause the print engine to perform the printing process, and thereafter retain in the storage the one or more print jobs for which the printing process has been completed; and in response to the job deletion printing button being operated via the reception interface, cause the print engine to perform the printing process, and thereafter delete from the storage the one or more print jobs for which the printing process has been completed.

5. The printing apparatus according to claim 1, wherein each print job contains authentication information, and wherein the controller is further configured to:

in response to receiving specific authentication information via the reception interface, cause the display to display one or more print jobs containing authentication information that matches the specific authentication information received via the reception interface among the print jobs stored in the storage.

6. The printing apparatus according to claim 5, wherein the controller is further configured to:

when the one or more print jobs containing the authentication information that matches the specific authentication information received via the reception interface are selected, and when the job retention printing is selected, retain in the storage the selected one or more print jobs for which the printing process has been completed, and store information indicating that the job retention printing is selected for the selected one or more print jobs in the storage in association with the selected one or more print jobs.

7. The printing apparatus according to claim 6, wherein the controller is further configured to:

set the single checkbox to select the job retention printing when the selected one or more print jobs are associated with the information indicating that the job retention printing is selected for the selected one or more print jobs.

8. The printing apparatus according to claim 1, wherein the storage includes a non-volatile memory and a volatile memory, and wherein the controller is further configured to:

cause the display to display the single checkbox when the print jobs are stored in the non-volatile memory, and cause the display to not display the single checkbox when the print jobs are stored in the volatile memory.

9. The printing apparatus according to claim 1, wherein the controller is further configured to:

in response to receiving via the reception interface a user input operation to log in to the printing apparatus, perform user authentication based on user identification information input via the reception interface;

after the user authentication, when a display setting for the display is OFF, perform a first printing process to cause the print engine to print images based on print jobs stored in the storage in association with the user identification information on sheets and thereafter to delete from the storage the print jobs for which printing has been completed; and after the user authentication, when the display setting for the display is ON, perform a second printing process including:

causing the display to display the print jobs stored in the storage in association with the user identification information, and the single checkbox;

selecting one or more print jobs from among the print jobs displayed on the display, in response to receiving an input operation to specify the one or more print jobs via the reception interface, and causing the print engine to print images based on the selected one or more print jobs on sheets;

after printing based on the selected one or more print jobs, retaining in the storage the one or more print jobs for which printing has been completed, when the job retention printing is selected by the single checkbox; and after printing based on the selected one or more print jobs, deleting from the storage the one or more print jobs for which printing has been completed, when the job deletion printing is selected by the single checkbox.

10. The printing apparatus according to claim 9, wherein the controller is further configured to perform the second printing process further including:

causing the display to display the print jobs stored in the storage in association with the user identification information, and the single checkbox;

in response to receiving a print instruction via the reception interface when the job retention printing is selected by the single checkbox, causing the print engine to print the images based on the selected one or more print jobs on the sheets, and thereafter retaining in the storage the one or more print jobs for which printing has been completed; and in response to receiving a print instruction via the reception interface when the job deletion printing is selected by the single checkbox, causing the print engine to print the images based on the selected one or more print jobs on the sheets, and thereafter deleting from the storage the one or more print jobs for which printing has been completed.

11. The printing apparatus according to claim 9, wherein the controller is further configured to perform the second printing process further including:

causing the display to display the print jobs stored in the storage in association with the user identification information, the single checkbox, and a print button;

in response to the print button being operated via the reception interface when the job retention printing is selected by the single checkbox, causing the print engine to print the images based on the selected one or more print jobs on the sheets, and thereafter retaining in the storage the one or more print jobs for which printing has been completed; and in response to the print button being operated via the reception interface when the job deletion printing is selected by the single checkbox, causing the print engine to print the images based on the selected one or more print jobs on the sheets, and thereafter deleting from the storage the one or more print jobs for which printing has been completed.

12. The printing apparatus according to claim 9,
wherein the controller is further configured to:
switch the display setting for the display between ON and OFF in response to an input operation received via the reception interface;
perform the second printing process further including causing the display to display a list of the print jobs stored in the storage when the display setting for the display is ON.

13. The printing apparatus according to claim 9, further comprising a communication interface configured to communicate with an external terminal,
wherein the controller is further configured to:
switch the display setting for the display between ON and OFF in response to an instruction received via the communication interface;
perform the second printing process further including causing the display to display a list of the print jobs stored in the storage when the display setting for the display is ON.

14. The printing apparatus according to claim 9,
wherein the storage includes a non-volatile memory and a volatile memory, and
wherein the controller is further configured to:
cause the display to display the single checkbox when the print jobs are stored in the non-volatile memory, and cause the display to not display the single checkbox when the print jobs are stored in the volatile memory.

15. The printing apparatus according to claim 1,
wherein the controller includes:
a processor; and
a non-transitory computer-readable storage medium storing computer-readable instructions that, when executed by the processor, cause the controller to:
cause the display to display thereon the print jobs stored in the storage, and the single checkbox;
in response to input operations received via the reception interface, select one or more print jobs from among the print jobs displayed on the display, and set the single checkbox to select one of the job retention printing and the job deletion printing;
cause the print engine to perform the printing process based on the selected one or more print jobs; and
after the printing process, determine whether to retain or delete the one or more print jobs for which the printing process has been completed, based on which of the job retention printing and the job deletion printing is selected by the single checkbox, wherein the one or more print jobs for which the printing process has been completed are retained in the storage after the printing process, when the job retention printing is selected, whereas the one or more print jobs for which the printing process has been completed are deleted from the storage after the printing process, when the job deletion printing is selected.

16. A non-transitory computer-readable storage medium storing computer-readable instructions executable by a processor of a printing apparatus comprising a touch panel having a reception interface and a display, a print engine, and a storage, the instructions being configured to, when executed by the processor, cause the printing apparatus to:
cause the display to display thereon a job selection screen, the job selection screen concurrently displaying a list of print jobs stored in the storage, and a single checkbox configured to select any one of job retention printing and job deletion printing;
in response to input operations received via the reception interface, select one or more print jobs from among the print jobs displayed on the display, and set the single checkbox to select one of the job retention printing and the job deletion printing;
cause the print engine to perform a printing process to print images based on the selected one or more print jobs on sheets;
determine whether to retain or delete the selected one or more print jobs after the printing process, based on which of the job retention printing and the job deletion printing is selected by the single checkbox, wherein the one or more print jobs for which the printing process has been completed are retained in the storage after the printing process, when the job retention printing is selected, whereas the one or more print jobs for which the printing process has been completed are deleted from the storage after the printing process, when the job deletion printing is selected;
display a job retention printing button on the job selection screen using wording of job retention printing displayed on a printing button when the job retention printing is selected by enabling the single checkbox, whereas displaying a job deletion printing button on the job selection screen using different wording of job deletion printing displayed on the printing button when the job deletion printing is selected by not enabling the single checkbox;
in response to the job retention printing button on the job selection screen being operated via the reception interface, cause the print engine to perform the printing process, and thereafter retain in the storage the one or more print jobs for which the printing process has been completed; and
in response to the job deletion printing button on the job selection screen being operated via the reception interface, cause the print engine to perform the printing process, and thereafter delete from the storage the one or more print jobs for which the printing process has been completed.

17. A method implementable on a controller of a printing apparatus comprising a touch panel having a reception interface, and a display, a print engine, and a storage, the method comprising:
causing the display to display thereon a job selection screen, the job selection screen concurrently displaying a list of print jobs stored in the storage, and a single checkbox configured to select any one of job retention printing and job deletion printing;
in response to input operations received via the reception interface, selecting one or more print jobs from among the print jobs displayed on the display, and setting the single checkbox to select one of the job retention printing and the job deletion printing;
causing the print engine to perform a printing process to print images based on the selected one or more print jobs on sheets;
determining whether to retain or delete the selected one or more print jobs after the printing process, based on which of the job retention printing and the job deletion printing is selected by the single checkbox, wherein the one or more print jobs for which the printing process has been completed are retained in the storage after the printing process, when the job retention printing is selected, whereas the one or more print jobs for which the printing process has been completed are deleted from the storage after the printing process, when the job deletion printing is selected;

displaying a job retention printing button on the job selection screen using wording of job retention printing displayed on a printing button when the job retention printing is selected by enabling the single checkbox, whereas displaying a job deletion printing button on the job selection screen using different wording of job deletion printing displayed on the printing button when the job deletion printing is selected by not enabling the single checkbox;

in response to the job retention printing button on the job selection screen being operated via the reception interface, causing the print engine to perform the printing process, and thereafter retain in the storage the one or more print jobs for which the printing process has been completed; and in response to the job deletion printing button on the job selection screen being operated via the reception interface, causing the print engine to perform the printing process, and thereafter delete from the storage the one or more print jobs for which the printing process has been completed.

18. The printing apparatus according to claim 1, wherein the job selection screen is configured to accept a collective selection of a plurality of jobs from the list and to concurrently display thereon the list of the print jobs stored in the storage, the single checkbox, and an operable select-all object configured to collectively select all the jobs included in the list.

19. The non-transitory computer-readable storage medium according to claim 16, wherein the job selection screen is configured to accept a collective selection of a plurality of jobs from the list and to concurrently display thereon the list of the print jobs stored in the storage, the single checkbox, and an operable select-all object configured to collectively select all the jobs included in the list.

20. The method according to claim 17, wherein the job selection screen is configured to accept a collective selection of a plurality of jobs from the list and to concurrently display thereon the list of the print jobs stored in the storage, the single checkbox, and an operable select-all object configured to collectively select all the jobs included in the list.

* * * * *